US008137424B2

(12) United States Patent
Ohzono

(10) Patent No.: US 8,137,424 B2
(45) Date of Patent: Mar. 20, 2012

(54) AIR CLEANING DEVICE FOR INTERNAL COMBUSTION ENGINE AND INTERNAL COMBUSTION ENGINE

(75) Inventor: Miyuki Ohzono, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 49 days.

(21) Appl. No.: 12/440,376

(22) PCT Filed: Aug. 12, 2008

(86) PCT No.: PCT/JP2008/064486
§ 371 (c)(1), (2), (4) Date: Mar. 6, 2009

(87) PCT Pub. No.: WO2009/034808
PCT Pub. Date: Mar. 19, 2009

(65) Prior Publication Data

US 2010/0154736 A1 Jun. 24, 2010

(30) Foreign Application Priority Data

Sep. 10, 2007 (JP) ................................ 2007-233566
Sep. 10, 2007 (JP) ................................ 2007-233567

(51) Int. Cl.
*B01D 46/00* (2006.01)

(52) U.S. Cl. ...................... 55/385.3; 55/418; 123/198 E

(58) Field of Classification Search ................. 55/385.3, 55/309, 418, 320, 332, 434, 482, 491, DIG. 28; 123/198 E; 180/219; 96/134, 384
See application file for complete search history.

(56) References Cited

U.S. PATENT DOCUMENTS 3,076,555 A 2/1963 Jackson et al.
3,557,537 A * 1/1971 Roberts ........................... 55/306
4,212,659 A * 7/1980 Magrini ....................... 55/385.3
4,291,530 A * 9/1981 Ballard ...................... 60/39.092
5,609,658 A * 3/1997 Takemura et al. ........... 55/385.3
6,251,151 B1 * 6/2001 Kobayashi et al. ............. 55/309
6,726,737 B2 * 4/2004 Schorn ......................... 55/385.3
6,740,149 B2 * 5/2004 Sudoh ............................ 96/384
(Continued)

FOREIGN PATENT DOCUMENTS

DE 33 36 725 A1 4/1985
(Continued)

*Primary Examiner* — Duane Smith
*Assistant Examiner* — Minh-Chau Pham
(74) *Attorney, Agent, or Firm* — Arent Fox LLP

(57) ABSTRACT

An air cleaner device that has a reduced size achieved by curving an air introduction path, that has a cleaner element with extended service life, and in which air flows uniformly in a clean chamber. The air introduction path (21) having an exit (21*o*) open to a dust chamber (12) of an air cleaner chamber (11) of an air cleaner (10) has a bent path partitioned by a flow regulation plate (22) into an inside branch path (23) inside the curve and an outside branch path (24) outside the curve. Airflows separately flowing into the dust chamber (12) from the exit (21*o*) after passing through the inside and outside branch paths (23, 24) are deflected upward and directed toward the cleaner element (F) by a first deflection section (33) and a second deflection section (34) arranged in the dust chamber (12). The second deflection section (34) is located at a position closer in the front-rear direction to the exit (21*o*) than the first deflection section (33).

15 Claims, 8 Drawing Sheets

U.S. PATENT DOCUMENTS

| | | | | |
|---|---|---|---|---|
| 7,637,974 | B2 * | 12/2009 | Scholl et al. | 55/340 |
| 7,670,411 | B2 * | 3/2010 | Suzuki | 96/134 |
| 7,678,165 | B2 * | 3/2010 | Tingle et al. | 55/306 |
| 2002/0033010 | A1 * | 3/2002 | Schorn | 55/385.3 |
| 2003/0029145 | A1 * | 2/2003 | Sudoh | 55/418 |
| 2005/0050867 | A1 * | 3/2005 | Taomo et al. | 55/385.3 |

FOREIGN PATENT DOCUMENTS

| | | | |
|---|---|---|---|
| FR | 1 422 236 | A | 12/1965 |
| FR | 1 497 966 | A | 10/1967 |
| JP | 55-93951 | A | 7/1980 |
| JP | 59-88261 | U | 6/1984 |
| JP | 61-142164 | U | 9/1986 |
| JP | 8-144732 | A | 6/1996 |
| JP | 10-213019 | A | 8/1998 |
| JP | 10-274026 | A | 10/1998 |
| JP | 11-81971 | A | 3/1999 |
| JP | 2000-110676 | A | 4/2000 |
| JP | 2000-346687 | A | 12/2000 |
| JP | 2001-173518 | A | 6/2001 |
| JP | 2001-200766 | A | 7/2001 |
| JP | 2005-155452 | A | 6/2005 |

* cited by examiner

AIR CLEANING DEVICE FOR INTERNAL COMBUSTION ENGINE AND INTERNAL COMBUSTION ENGINE

CROSS-REFERENCE TO RELATED APPLICATION

This application is a National Stage entry of International Application No. PCT/JP2008/064486 filed Aug. 12, 2008, which claims priority to Japanese Application Numbers P. 2007-233566, filed Sep. 10, 2007 and P. 2007-233567, filed Sep. 10, 2007, the disclosure of the prior applications is hereby incorporated in their entirety by reference.

TECHNICAL FIELD

The present invention relates to an air cleaning device of an intake device for an internal combustion engine and the internal combustion engine.

BACKGROUND ART

As for an air cleaning device for an internal combustion engine in which an air cleaner chamber is divided into a dust chamber and a clean chamber with a cleaner element interposed therebetween, an outlet of an air introduction passage is opened to the dust chamber and an inlet of an air discharge passage is opened to the clean chamber, it is known that means for allowing air flowing to the dust chamber to substantially uniformly impinge on the cleaner element is provided in the dust chamber (for example, see Patent Document 1).

Patent Document 1: Japanese Patent Unexamined Publication No. JP-A-2000-346687

DISCLOSURE OF THE INVENTION

Problem that the Invention is to Solve

In some cases, in an air cleaning device for an internal combustion engine, because there are constraints due to a space in which the internal combustion engine is disposed or peripheral components disposed around the air cleaning device, an air introduction passage for introducing into a dust chamber air entering from the outside of the internal combustion engine is formed to be a curved passage. However, by centrifugal force, the air flowing in the curved passage becomes a flow in which a flow rate on the curved outside is largely biased. In such a state, when the air flowing to the dust chamber from the air introduction passage having the curved passage impinges on a cleaner element, a portion of the cleaner element, mainly corresponding to the air from the curved outside, gets more seriously taint damage (e.g., clogged) than other portions and thus the life of the cleaner element is shortened.

In addition, when the air flowing to the dust chamber from the air introduction passage is divided into a plurality of flows in the duct chamber, the flow of the air in a clean chamber is biased when a time lag between the timings at which the divided air impinges on the cleaner element, respectively, is large. Accordingly, the flow of the air in an air discharge passage is also biased. The bias of the flow of the air in the air discharge passage causes the formation of a mixture gas, the reduction of the uniformity of mixing with a blow-by gas or a recirculating exhaust gas by an exhaust gas recirculation device, or the reduction of the detection accuracy of an air flow meter when the air discharge passage is provided with the air flow meter to detect the flow rate of the air.

The invention is achieved in view of such problems and an object of the invention is to miniaturize an air cleaning device by causing an air introduction passage to be curved, lengthen the life of a cleaner element and improve the uniformity of a flow of air in a clean chamber in the air cleaning device for the internal combustion engine.

Means for Solving the Problem

The invention described in (1) is an air cleaning device for an internal combustion engine, including:

an air cleaner chamber divided into a dust chamber formed on a lower side and a clean chamber formed on the upper side while interposing a cleaner element therebetween in a vertical direction, wherein an outlet of an air introduction passage having an air introduction port is opened to the dust chamber, an inlet of an air discharge passage is opened to the clean chamber, characterized in that a chamber wall of the air cleaner chamber includes a bottom wall opposed to the cleaner element in the vertical direction and a pair of side walls erects from the bottom wall, the pair of side walls includes a first side wall to which the air introduction passage is connected and a second side wall which is opposed to the first side wall in an opposing direction while interposing the cleaner element therebetween, the air introduction passage has a curved passage which is divided into a curved inside branch passage and a curved outside branch passage by a partition wall a first path length from the introduction port to the outlet via the curved inside branch passage is set to be shorter than a second path length from the introduction port to the outlet via the curved outside branch passage by the curved passage, the curved passage is curved in a direction crossing the opposing direction toward the upstream side, as viewed in the vertical direction, first and second deflecting portions are provided in the dust chamber to deflect upward flows of air flowing to the dust chamber from the outlet via the curved inside branch passage and the curved outside branch passage, respectively, to thereby direct the flows to the cleaner element and the second deflecting portion is positioned nearer to the outlet than the first deflecting portion in the opposing direction.

The invention described in (2) is the air cleaning device for the internal combustion engine described in (1), wherein the air discharge passage extends toward the second side wall from the first side wall and has the inlet at a position distant from the first side wall in the clean chamber and the second deflecting portion is positioned between the first side wall and the inlet in the opposing direction.

The invention described in (3) is the air cleaning device for the internal combustion engine described in (1) or (2), wherein the first and second deflecting portions includes a raised portion which is provided on the bottom wall and is raised upward.

The invention described in (4) is the air cleaning device for the internal combustion engine according to any one of (1) to (3), wherein an interval between the first and second deflecting portions in the opposing direction is substantially the same as a difference between the first path length and the second path length.

The invention described in (5) is the air cleaning device for the internal combustion engine described in (1), wherein the air discharge passage has an upstream passage having the inlet and an outflow port through which the air flowing from the inlet flows to the outside of the clean chamber, the upstream passage is formed by an upstream duct connected to the side wall of the clean chamber in the first side wall and extending in the opposing direction in the clean chamber and the first and second deflecting portions are positioned between the inlet and the outflow port in the opposing direction, as viewed in the vertical direction.

The invention described in (6) is the air cleaning device for the internal combustion engine described in (5), wherein the first deflecting portion is disposed near the inlet in the opposing direction and wherein the second deflecting portion is disposed near the outflow port in the opposing direction.

The invention described in (7) is an internal combustion engine including:

an air flow meter which detects flow rate of air flowing in an intake passage; and the air cleaning device according to any one of (1) to (6), forming an air passage constituting the intake passage, wherein the air passage includes a first air passage which is disposed downstream of the air flow meter and a second air passage which has a surrounding passage at least partially surrounding in a circumferential direction a downstream duct forming the first air passage and to which an outflow port of the first air passage is opened and a blow-by gas introduction port through which a blow-by gas flows to the intake passage is opened to the surrounding passage in the upstream of the outflow port.

The invention described in (8) is the internal combustion engine described in (7), wherein the surrounding passage is an annular passage surrounding the downstream duct over whole circumference thereof.

The invention described in (9) is the internal combustion engine described in (7) or (8), wherein a flow direction of the air at an inflow port of the first air passage and a flow direction of the air at an outlet of the second air passage are different from each other and the downstream duct is a curved duct curved so as to direct the flow of the air at the outflow port to the outlet of the second air passage and the first air passage is a curved passage.

The invention described in (10) is the internal combustion engine described in (9), wherein the blow-by gas introduction port is disposed on the upper side and on the curved inside with respect to a passage center line of the curved duct in the surrounding passage.

The invention described in (11) is the internal combustion engine described in any one of (7) to (10), wherein the air cleaning device has an upstream duct having the air flow meter mounted thereon, the downstream duct and a second downstream duct forming the second air passage and the downstream duct is a seal member for sealing a space between the upstream duct and the second downstream duct.

Advantage of the Invention

According to the invention described in (1), an air introduction passage connected to a first side wall among a pair of side walls which are opposed to each other with a cleaner element interposed therebetween in an opposing direction is curved in a direction crossing the opposing direction in plan view. Thus, an air cleaning device can be miniaturized in the opposing direction.

Further, since there is provided a partition wall for dividing a curved passage into a curved inside branch passage and a curved outside branch passage, a flow of air in the curved passage is regulated so as not to be deflected to the curved outside. Thus, the flow of the air flowing to a dust chamber from the air introduction passage having the curved passage is uniformized. In addition, positions of first and second deflecting portions are different from each other in the opposing direction. Thus, the flows of the air from branch passages can be directed to the cleaner element over a wide range in the opposing direction. Accordingly, the air flowing to the dust chamber from the air introduction passage having the curved passage in which the curved inside branch passage and the curved outside branch passage are formed by the partition wall can uniformly impinge on the cleaner element and the whole cleaner element can be used. Thus, the life of the cleaner element can be prolonged.

Further, since the second deflecting portion is positioned nearer to the first deflecting portion in accordance with a second path length being longer than a first path length, a time lag between the timings at which the flows of the air flowing to the dust chamber from the curved inner branch passage and the curved outside branch passage are deflected by the first and second deflecting portions, respectively, is reduced. Consequently, the time lag between the timings at which the flows of the air impinge on the cleaner element, respectively, is reduced. Therefore, the deflections of the flows of the air in a clean chamber and in an air discharge passage are suppressed and the uniformity of the flow of the air in the air discharge passage is thereby improved.

According to the invention described in (2), the air deflected by the second deflecting portion passes through the cleaner element and then flows to an area between the first side wall and an inlet of the air discharge passage in the opposing direction in the clean chamber to flow toward the inlet. Accordingly, the generation of stagnation of the air in the area of the clean chamber is suppressed and thus the flow of the air in the clean chamber becomes smooth. As a result, the air in the dust chamber can uniformly impinge on the cleaner element even when the inlet of the air discharge passage is disposed away from the first side wall.

According to the invention described in (3), the flows of the air flowing to the dust chamber from the branch passages and then flowing in the vicinity of a bottom wall along the bottom wall are deflected toward the cleaner element disposed on the upper side by the deflecting portions constituted by a raised portion raised forward from the bottom wall. Accordingly, the flow of the air between the bottom wall and the cleaner element is efficiently directed to the cleaner element by the flows of the air deflected by the deflecting portions from the vicinity of the bottom wall. As a result, since the deflecting portions for allowing the air flowing from the air introduction passage to uniformly impinge on the cleaner element can be miniaturized, air flow resistance in the dust chamber is reduced and an air-intake efficiency is improved.

According to the invention described in (4), the first and second deflecting portions are disposed away from each other with an interval therebetween, which is substantially the same as a difference in lengths of the path passing through the curved inside branch passage and the path passing through the curved outside branch passage. Accordingly, the time lag between the timings at which the flows of the air flowing to the dust chamber from the curved inside branch passage and the curved outside branch passage are deflected by the first and second deflecting portions, respectively, is largely reduced. Consequently, the time lag between the timings at which the flows of the air impinge on the cleaner element, respectively, is largely reduced. Therefore, the deflection of the flow of the air in the clean chamber and the air discharge passage is more suppressed and the uniformity of the flow of the air in the air discharge passage is thereby more improved.

According to the invention described in (5), the air deflected by the second deflecting portion passes through the cleaner element and then flows to an area between an inlet and an outflow port of an upstream passage in the clean chamber to flow toward the inlet. Accordingly, the generation of stagnation of the air in the area of the clean chamber is suppressed and thus the flow of the air in the clean chamber becomes smooth. As a result, the air in the dust chamber can uniformly impinge on the cleaner element by the second deflecting portion even when the inlet and the outflow port of the upstream passage formed by an upstream duct disposed in the clean chamber are disposed away from each other in the opposing direction.

According to the invention described in (6), the air flowing from the air introduction passage in the dust chamber is deflected upward so as to be directed to the area between the inlet of the upper passage and the second side wall in the opposing direction. Further, by the second deflecting portion, the air is deflected upward so as to be directed to the area between the inlet and the outflow port in the opposing direction. As a result, the air in the dust chamber can uniformly impinge on the cleaner element. In addition, since interference between the flows of the air deflected by the first and second deflecting portions can be reduced, an effect of allowing the air to uniformly impinge on the cleaner element can be more improved.

According to the invention described in (7), a surrounding passage to which a blow-by gas introduction port is opened is a passage surrounding a downstream duct. Accordingly, the surrounding passage is a passage in which the flow of the air is less than that of a first air passage and flow rate fluctuation of a blow-by gas is reduced in the surrounding passage. In addition, since the flow rate fluctuation of the blow-by gas is transmitted to the air in the first air passage from the outflow port via the surrounding passage, a transmission path length when the flow rate fluctuation is transmitted to an air flow meter from the blow-by gas introduction port is longer than a length of the first air passage by a length of the surrounding passage.

As a result, an effect of the flow rate fluctuation of the blow-by gas flowing to an intake passage on the detection of the flow rate of the air by the air flow meter is reduced and the detection accuracy of the air flow meter is improved. By the surrounding passage, the transmission path length is made longer without making the length of the first air passage longer and thus an effect of the flow rate fluctuation of the blow-by gas on the air flow meter can be reduced and the air cleaning device can be miniaturized.

According to the invention described in (8), the surrounding passage is an annular passage surrounding a first downstream duct over the whole circumference thereof and thus the volume of the surrounding passage is large and the flow rate fluctuation of the blow-by gas in the surrounding passage is more reduced. Accordingly, an effect of the flow rate fluctuation of the blow-by gas on the detection of the flow rate of the air flow meter can be more reduced.

Further, the blow-by gas can be allowed to flow to the downstream of the outflow port over a wide range in a circumferential direction and thus the uniformity of mixing of the blow-by gas with the air flowing from the first downstream duct can be improved.

According to the invention described in (9), even when a flow direction of the air at an inflow port of the first air passage and a flow direction of the air at an outlet of a second air passage are different from each other, the air flowing in the first air passage is smoothly introduced toward the outlet by a curved duct to flow from the outflow port toward the outlet. Thus, the air flowing from the first air passage is suppressed so as not to flow in a turbulent manner in the second air passage and the air-intake efficiency is improved.

According to the invention described in (10), the blow-by gas introduction port is disposed on the upper side and on the curved inside with respect to a passage center line of the curved duct in the surrounding passage. Thus, the remaining oil remaining in the blow-by gas flows toward the outflow port together with the blow-by gas while dropping in the surrounding passage and is mixed with the air flowing from the curved passage. As a result, by effectively using a space formed when the curved duct is used, the accumulation of the remaining oil in a lower portion of the surrounding passage is suppressed and the remaining oil is easily introduced into the second air passage disposed downstream of the outflow port.

Further, the curved inside space formed on the more curved inside than the passage center line of the curved duct is a space narrower than the curved outside space formed on the more curved outside than the passage center line. Since the blow-by gas introduction port not requiring a large space for the arrangement is disposed in the curved inside space, a part of the air cleaning device or a different member such as a peripheral component around the air cleaning device can be disposed in the curved outside space. In this manner, the use of the curved outside space can be maximized. In addition, by effectively using the space formed when the curved duct is used, a degree of freedom in arrangement of the different member can be increased and thus the miniaturization of the air cleaning device or the compact arrangement of the air cleaning device and the peripheral component can be realized.

According to the invention described in (11), the downstream duct also acts as a seal member for air-tightly connecting the upstream duct and a second downstream duct. As a result, only the upstream duct, the downstream duct and the second downstream duct 70 are required and a different seal member is not required. In this manner, the number of components can be reduced and the cost can be thereby reduced.

DESCRIPTION OF REFERENCE NUMERALS AND SIGNS

10: AIR CLEANER
11: AIR CLEANER CHAMBER
12: DUST CHAMBER
13: CLEAN CHAMBER
14: BOTTOM WALL
16, 17: SIDE WALL
21: AIR INTRODUCTION PASSAGE
21*i*: INTRODUCTION PORT
210: OUTLET
22: RECTIFICATION PLATE
23, 24: BRANCH PASSAGE
33, 34: DEFLECTING PORTION
41: AIR DISCHARGE PASSAGE
50: UPSTREAM DUCT
51: UPSTREAM PASSAGE
60: CURVED DUCT
61: CURVED PASSAGE
62: UPSTREAM CONNECTING PORTION
63: CURVED PORTION
64: PASSAGE PORTION
65: CURVED PASSAGE PORTION
70: DOWNSTREAM DUCT
71: DOWNSTREAM PASSAGE
73: SURROUNDING PORTION
74: UPSTREAM CONNECTING PORTION
76: SURROUNDING PASSAGE
80: AIR FLOW METER
87: BLOW-BY GAS INTRODUCTION PORT
A: AIR CLEANING DEVICE
D: OPPOSING DIRECTION
F: CLEANER ELEMENT

BEST MODE FOR CARRYING OUT THE INVENTION

Hereinafter, embodiments of the invention will be described with reference to FIGS. 1 to 8.

Figure 1:
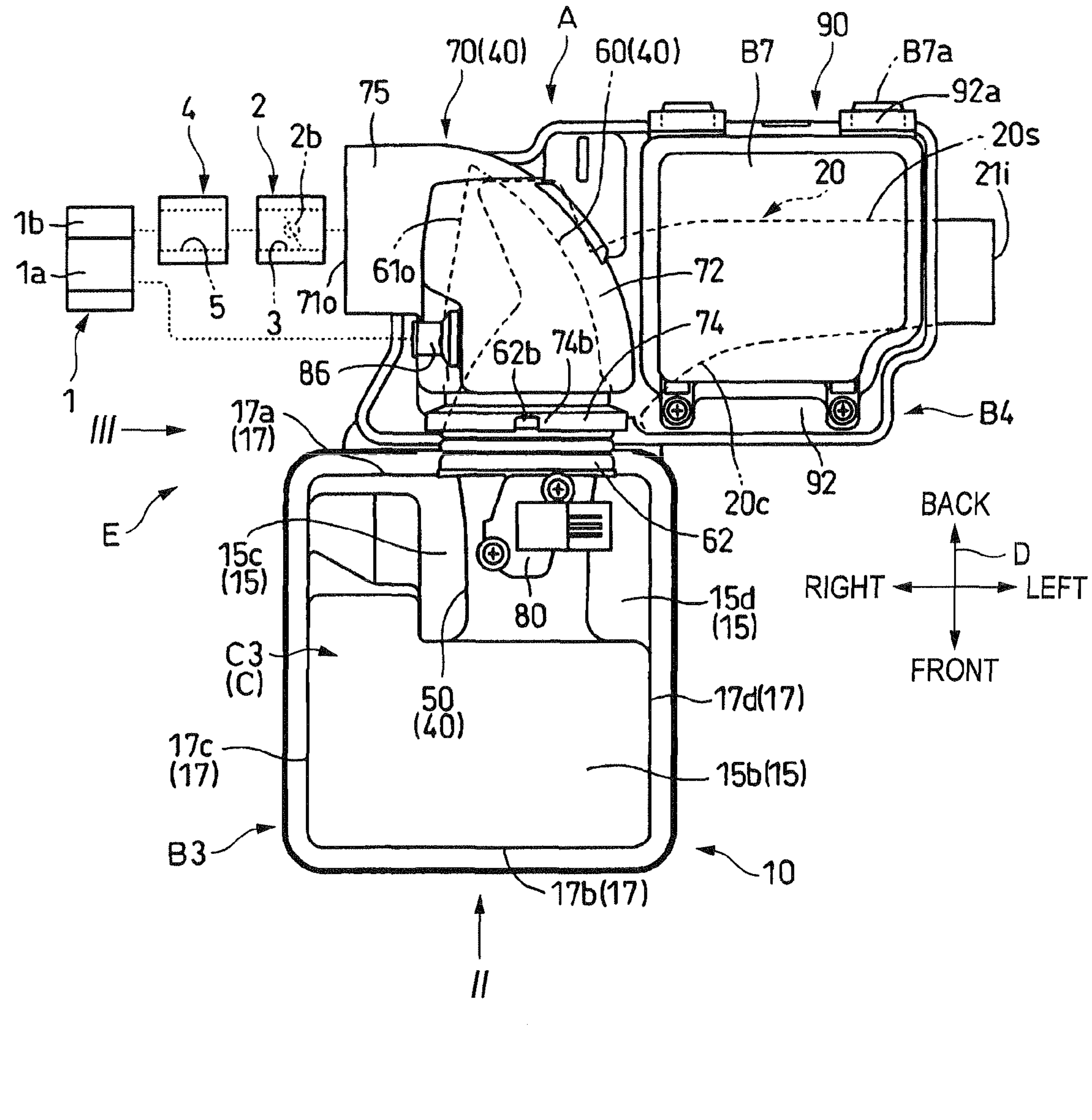
FIG. 1 is a plan view showing a main part of an air cleaning device for an internal combustion engine to which the invention is applied and schematically showing components shown in FIG. 4.
Figure 2:
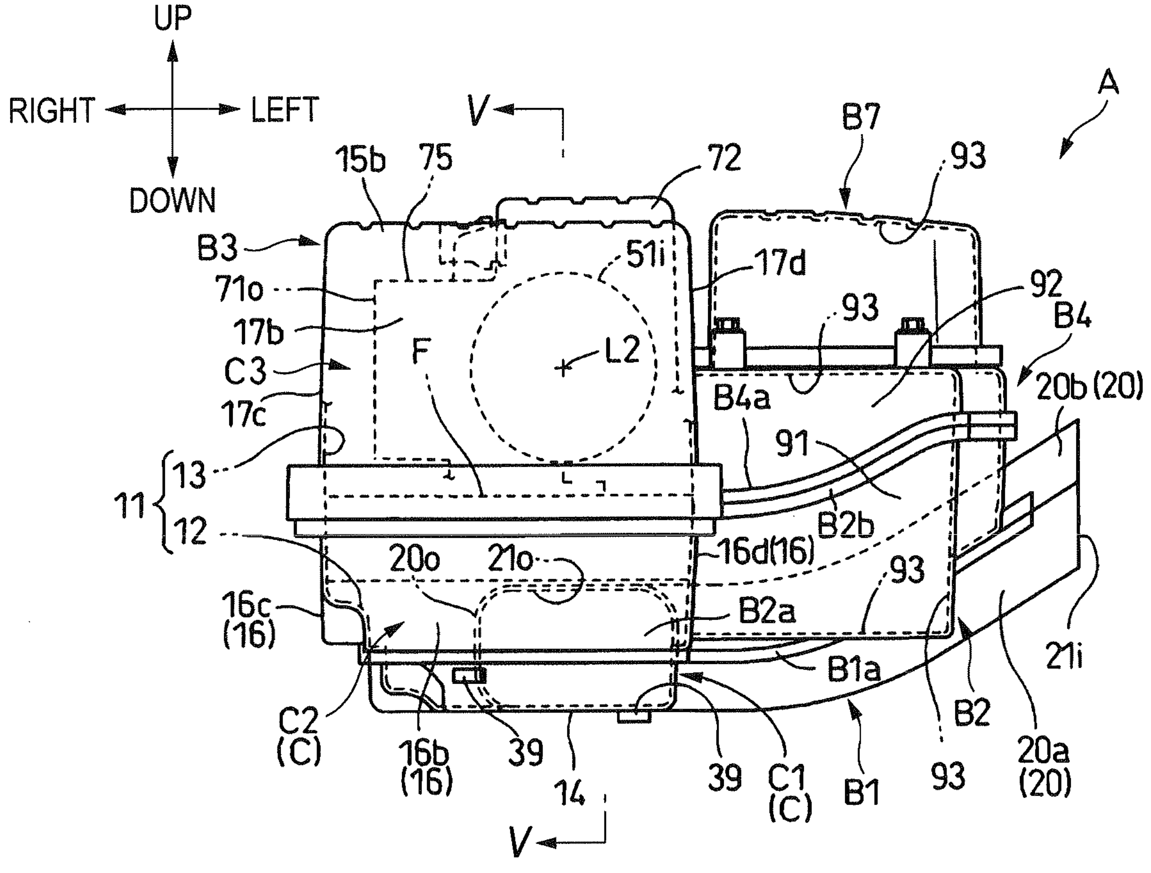
FIG. 2 is a view as viewed in a direction of an arrow II of FIG. 1.
Figure 3:
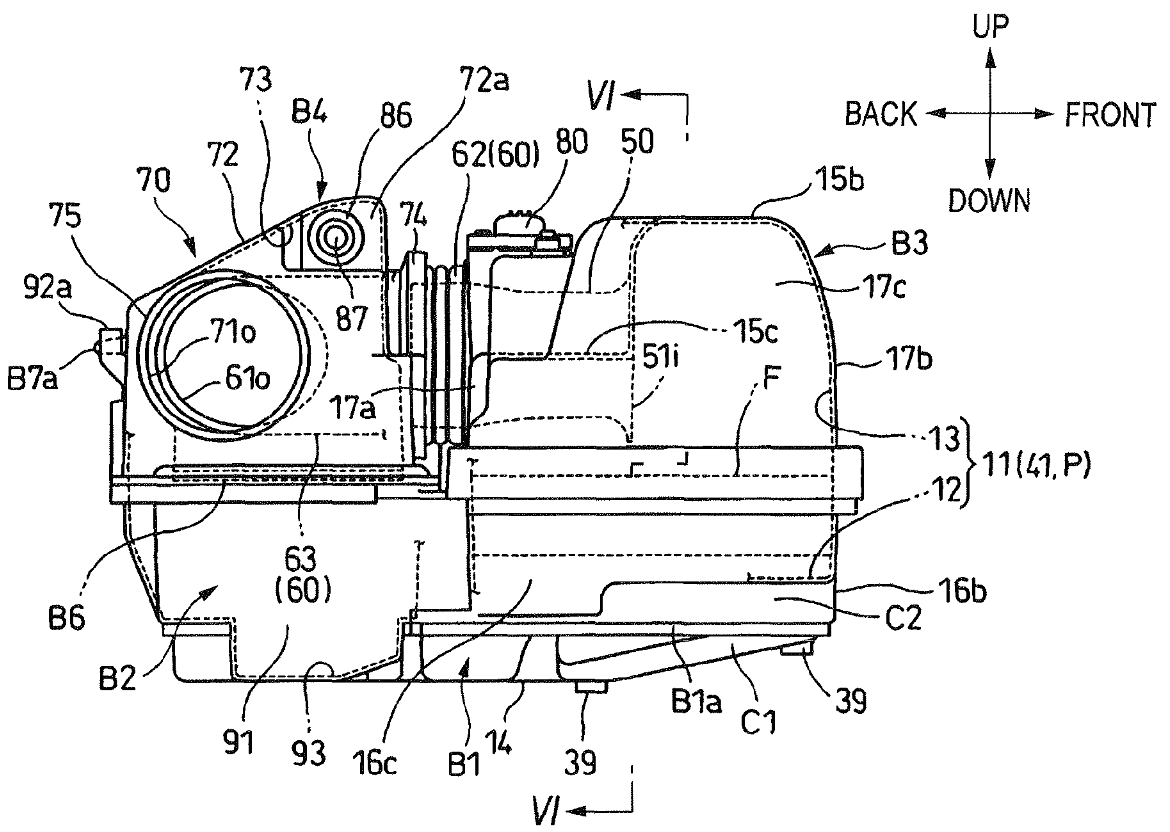
FIG. 3 is a view as viewed in a direction of an arrow III of FIG. 1.
Figure 4:
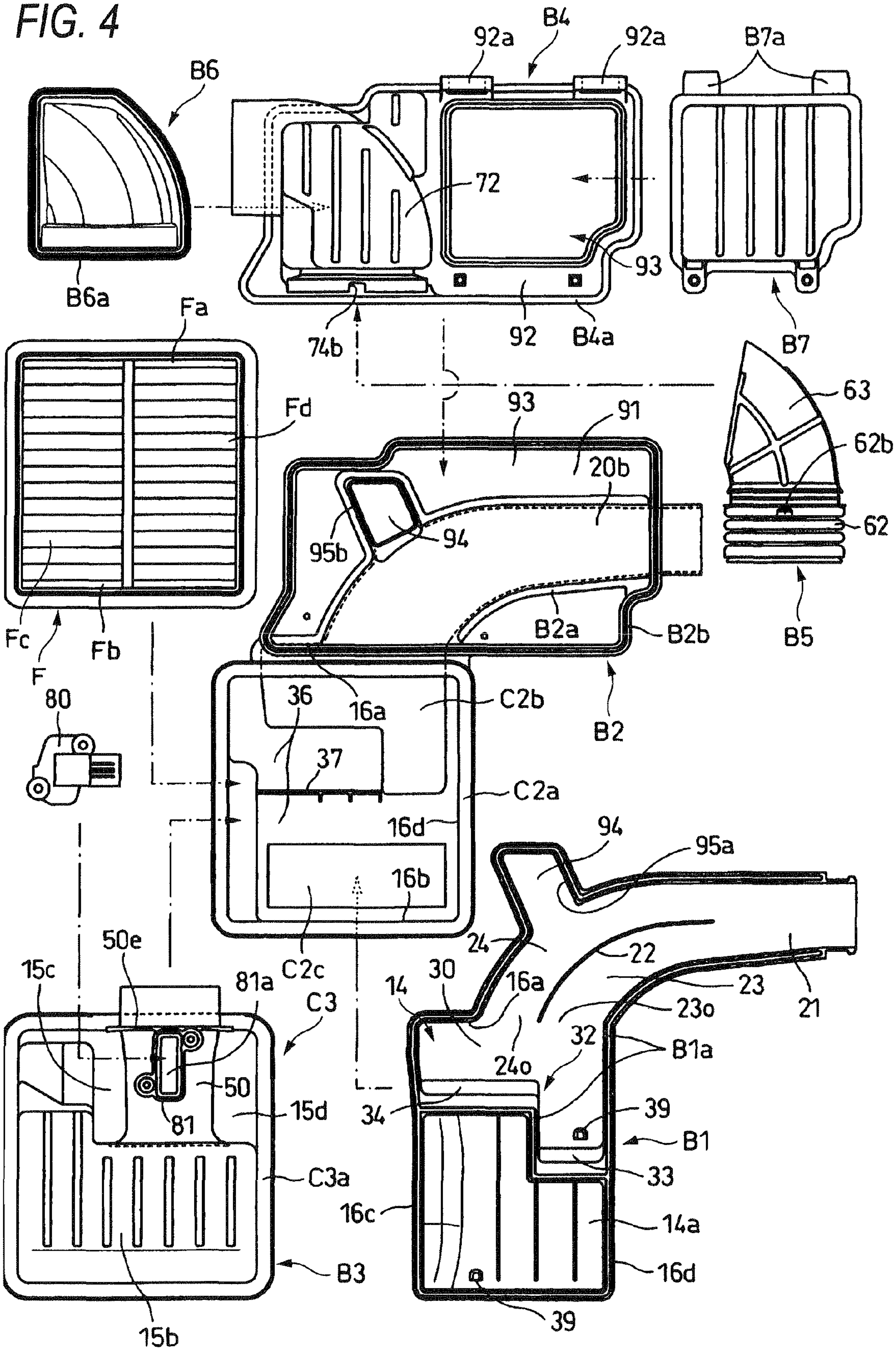
FIG. 4 is an exploded plan view of the air cleaning device of FIG. 1.

Referring to FIGS. 1 to 3, an internal combustion engine E to which the invention is applied is mounted on a front-wheel-drive vehicle and an intake device of the internal combustion engine E has an air cleaning device A as an intake component provided with an air cleaner 10, a throttle valve device 2 and an intake pipe device 4. The internal combustion engine E and a transmission to which power generated from the internal combustion engine E is input constitute a power unit and the power unit is disposed in an engine room formed in the front of a vehicle body.

The multicylinder 4-stroke internal combustion engine E has an engine body 1 having a cylinder block 1*a* in which a piston is reciprocatably fitted and a cylinder head 1*b* connected to the cylinder block 1*a*. The piston, which is driven by a pressure of a combustion gas generated by the combustion of a mixture gas in a combustion chamber provided in the engine body 1, drives and rotates a crankshaft supported by the engine body 1.

The intake device forms an air intake passage (hereinafter, referred to as "intake passage") for introducing combustion air into the combustion chamber provided in the engine body 1 and the air cleaning device A forms an air passage P (see FIGS. 5, 7 and 8) constituting at least a part of the intake passage.

The air flowing in the intake passage passes through an intake port provided in the cylinder head 1*b* and then is sucked into the combustion chamber when an intake valve which is driven by a valve train of the internal combustion engine E and synchronized with an engine rotational speed to open and close the intake port is opened. Accordingly, in the internal combustion engine E, intake pulsation resulting from the opening and closing of the intake valve occurs in the intake passage.

Figure 5:
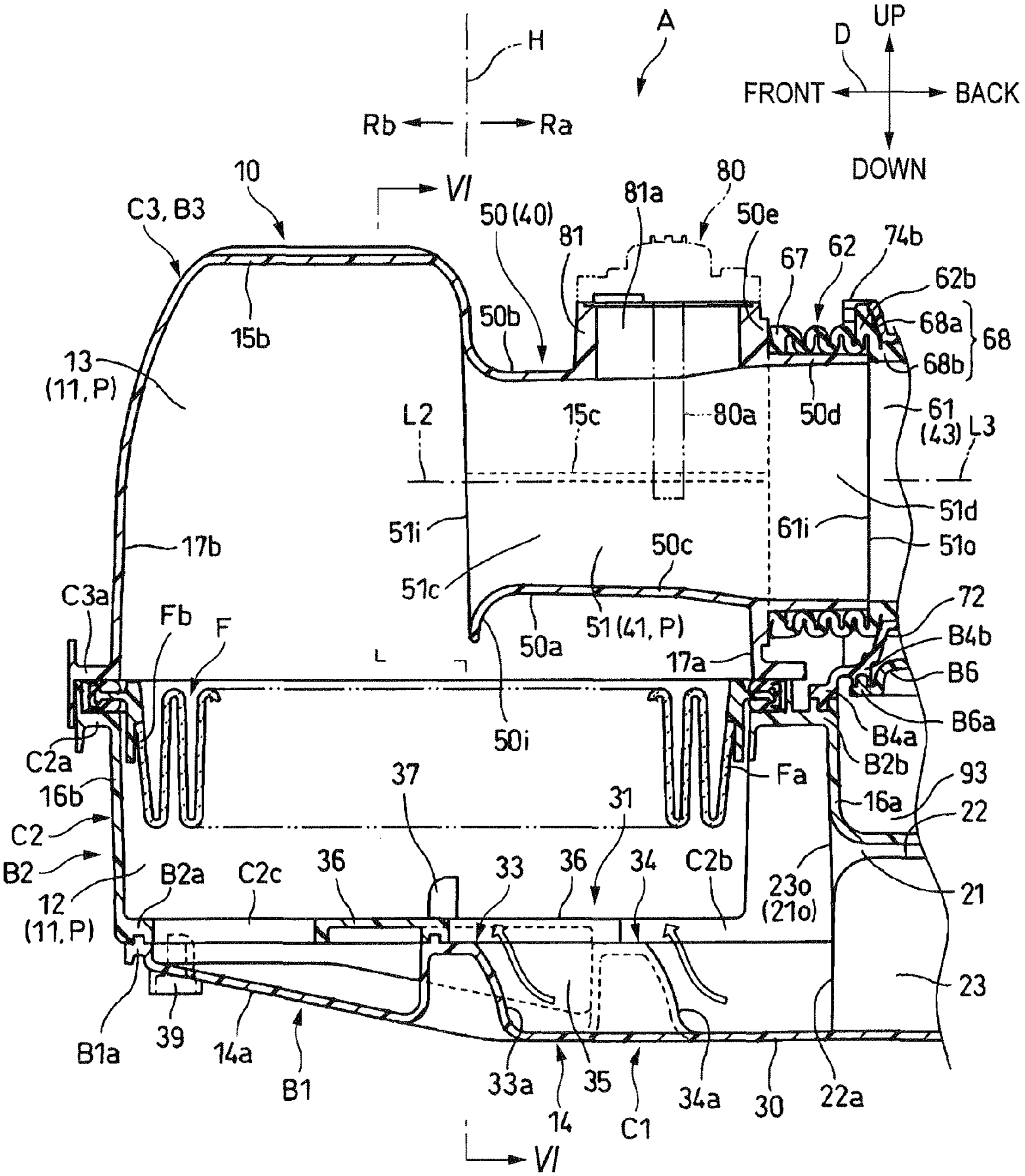
FIG. 5 is a cross-sectional view, taken along the line V-V of FIGS. 2 and 6.
Figure 7:
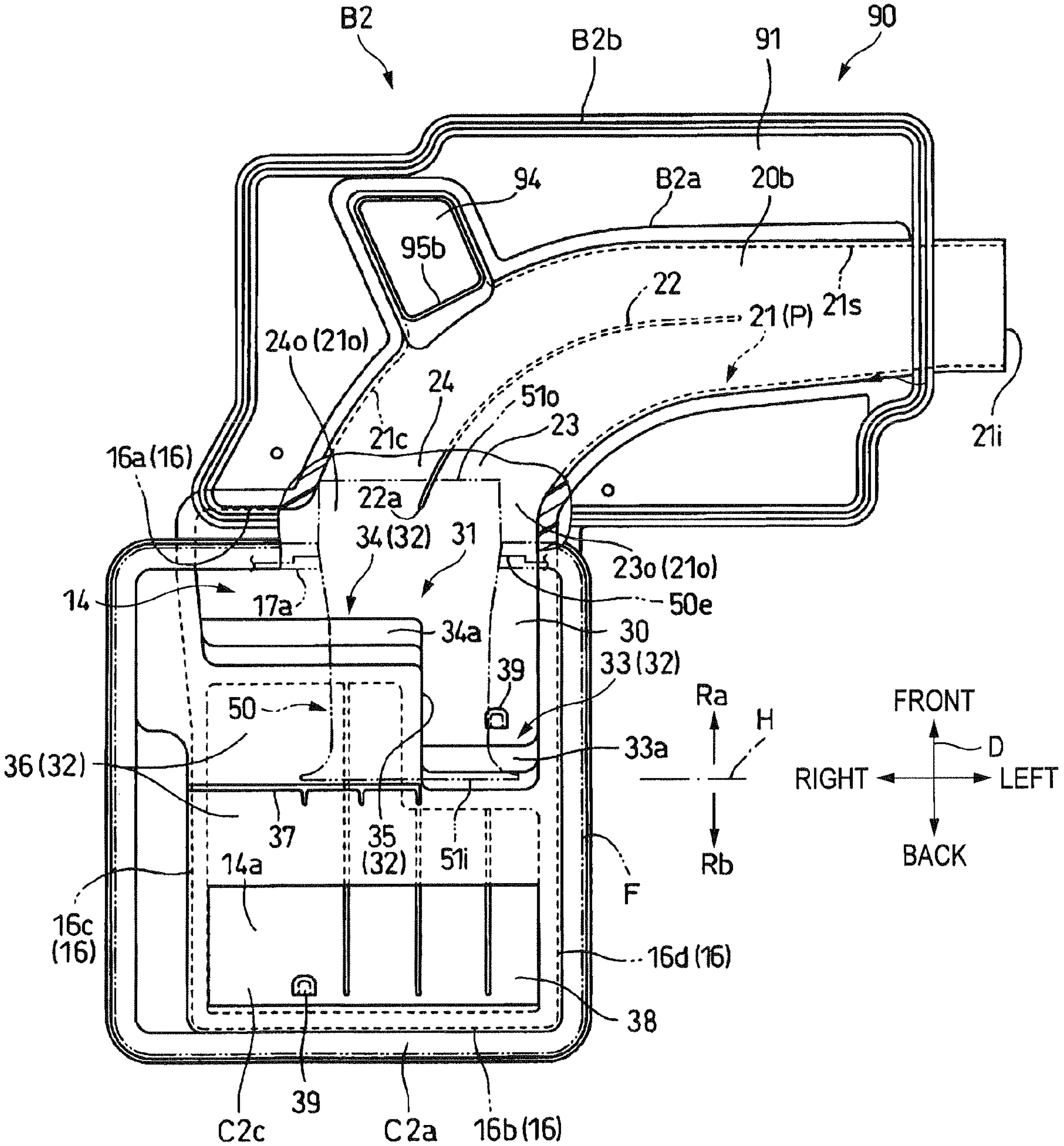
FIG. 7 is a plan view showing the air cleaning device of FIG. 1 partially in cross section, in a state in which a part is removed.

As for the air cleaning device A, a vertical direction is a direction when an air cleaner chamber 11 to be described later is divided into a dust chamber 12 formed on the lower side and a clean chamber 13 formed on the upper side with a cleaner element F interposed therebetween in the vertical direction. As an example of the vertical direction, the directions shown in FIGS. 2 and 5 are set as the vertical direction in this embodiment. In addition, as shown in FIGS. 1 and 7, the directions perpendicular to each other on a horizontal plane which is a plane perpendicular to the vertical direction are set as a back-and-forth direction as a first direction and a left-and-right direction as a second direction.

Herein, when one of the back and forth is set as one direction of the first direction, the other of the back and forth is set as the other direction of the first direction and when one of the left and right is set as one direction of the second direction, the other of the left and right is set as the other direction of the second direction.

Accordingly, when the internal combustion engine E having the intake device on which the air cleaning device A is assembled is mounted on a vehicle as a machine, the vertical direction may be substantially coincident with a vertical direction of the vehicle, but not necessarily substantially coincident with the vertical direction of the vehicle.

As an example, when the internal combustion engine E is mounted on the vehicle, the air cleaning device A is mounted on the power unit via a plurality of mounting portions (not shown) such that the back-and-forth direction is substantially set as a back-and-forth direction of the vehicle and the left-and-right direction is substantially set as a left-and-right direction of the vehicle (width direction of vehicle) in a state in which the vertical direction of the air cleaning device is substantially coincident with the vertical direction of the vehicle so as to slightly incline the air cleaning device downward toward the front.

The contents described herein, including the expressions modified by the term "substantially", include the contents when not being modified by the term "substantially".

Referring to FIGS. 1 to 4, the air cleaning device A has a plurality of passage, forming members for forming the air passage P, the cleaner element F and a cover B7. The plurality of passage forming members include first to fourth members B1 to B4, a duct B5 and a cover B6. These first to fourth members B1 to B4, duct B5 and cover B6 are connected to each other to form the air passage P.

Each of the first to fourth members B1 to B4 and the two covers B6 and B7 is a single member formed of synthetic resin and the duct B5 is a single member formed of elastomer (herein, rubber).

The air cleaning device A has the air cleaner 10, an introduction duct 20 and a discharge duct 40 which are connected to the air cleaner 10, respectively and a resonator 90. The air cleaner 10 acts as a downstream component which is disposed downstream of the introduction duct 20 and also acts as an upstream component which is disposed upstream of the discharge duct 40.

Figure 6:
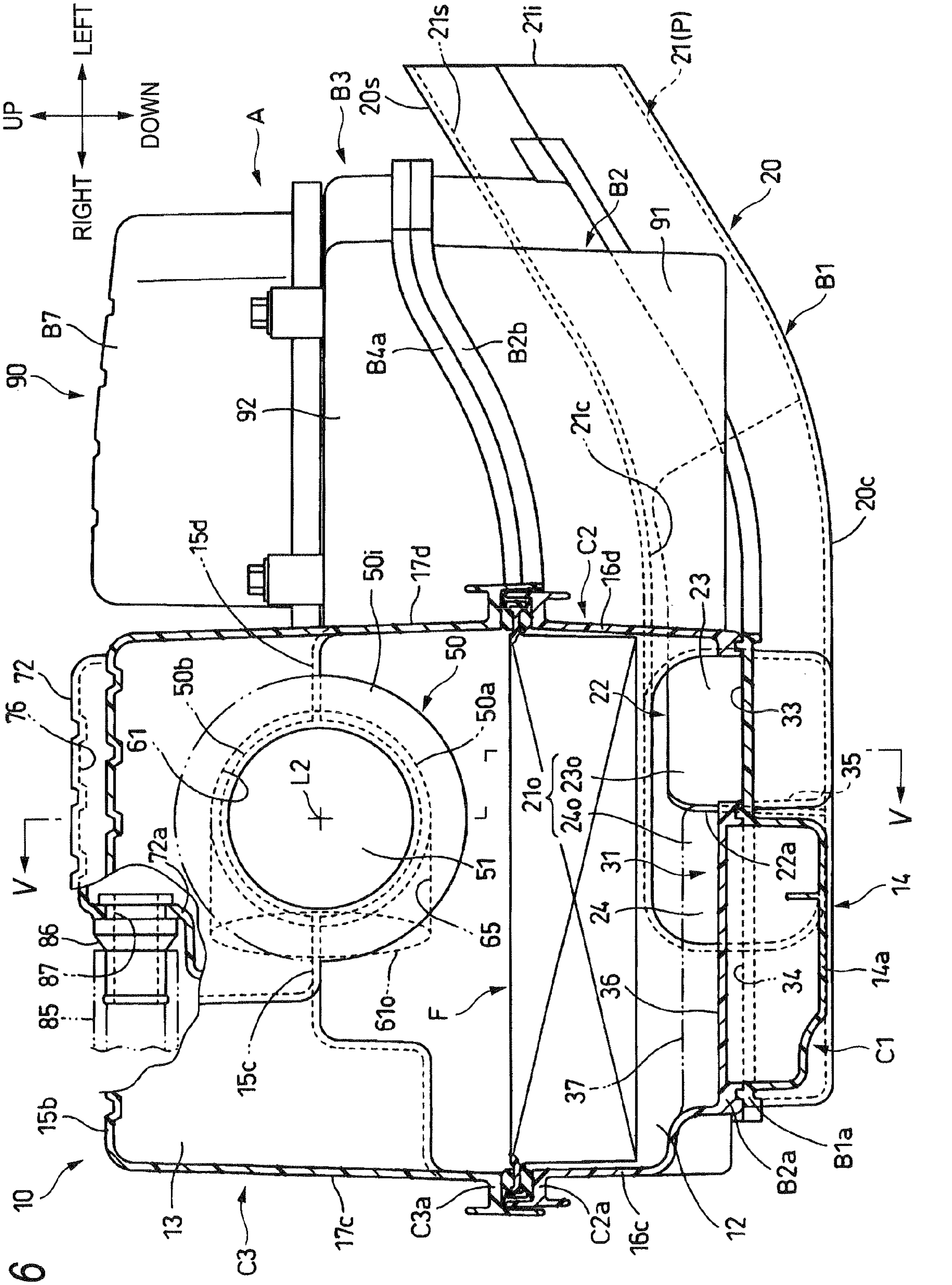
FIG. 6 is a cross-sectional view, taken along the line VI-VI of FIGS. 3 and 5.

Further, referring to FIGS. 5 to 7, the air cleaner 10 has an air cleaner case C which forms the air cleaner chamber 11 and the cleaner element F which is disposed in the air cleaner chamber 11 to serve as a filtering member for removing dust in the air passing through the air cleaner chamber 11. By the cleaner element F held in the air cleaner case C, the air cleaner chamber 11 is divided into the dust chamber 12 which is formed on the lower side as an upstream chamber and the clean chamber 13 which is formed on the upper side as a downstream chamber with the cleaner element F interposed therebetween in the vertical direction.

The introduction duct 20 forms an air introduction passage 21 for introducing into the dust chamber 12 the air entering from the outside of the internal combustion engine E. The discharge duct 40 forms an air discharge passage 41 for introducing into the throttle valve device 2 the clean air in the clean chamber 13, which passes through the cleaner element F after flowing to the dust chamber 12 from the air introduction passage 21 (see FIG. 8). Accordingly, the air passage P is made up of the air introduction passage 21, the air cleaner chamber 11 and the air discharge passage 41.

Herein, the upstream and the downstream are related to the flow of the air flowing toward the combustion chamber from an introduction port 21*i* of the air introduction passage 21 in the intake passage. Further, hereinafter, a flow direction of the air in the intake passage is referred to as “flow direction”.

The resonator 90 is provided with a resonance chamber 93 and a resonance communicating passage 94 for communicating the resonance chamber 93 with the air introduction passage 21. In a specific engine rotational speed range, the resonator 90 has a function of reducing intake noise or increasing torque of the internal combustion engine E as an intake silencer.

The air cleaner case C is made up of a plurality of case constituting members, in this embodiment, the air cleaner case C is constructed such that first to third cases C1 to C3, which are three case constituting members, are laminated from the lower side in this order. The first and second cases C1 and C2 as a bottom case and an intermediate case constitute a lower case and the third case C3 constitutes an upper case.

The cleaner element F is interposed between holding portions C2*a* and C3*a* provided in the second and third cases C2 and C3 to be held in an airtight state. The holding portions C2*a* and C3*a* are rectangular frames and the cleaner element F has a rectangular shape, as viewed in the vertical direction (hereinafter, referred to as “in plan view”).

A chamber wall of the air cleaner chamber 11 includes a bottom wall 14 formed by the first and second cases C1 and C2, a top wall 15 formed by the third case C3 and side walls 16 and 17 which are erected from the bottom wall 14 and surround the air cleaner chamber 11 between the bottom wall 14 and the top wall 15. The bottom wall 14 and the top wall 15 are opposed to the cleaner element F in the vertical direction. The side walls 16 and 17 having the first to third cases C1 to C3 are constituted by pair of side walls 16*a*, 17*a*; 16*b*, 17*b* opposed to each other in the back-and-forth direction as an opposing direction D and pair of side walls 16*c*, 17*c*; 16*d*, 17*d* opposed to each other in the left-and-right direction as a direction perpendicular to the opposing direction D, as viewed in the vertical direction (hereinafter, referred to as “in plan view”) and have a rectangular shape in plan view. The pairs of side walls 16*a*, 17*a*; 16*b*, 17*b* are constituted by first side walls 16*a* and 17*a* (also referred to as back walls) to which the air introduction passage 21 and the air discharge passage 41 are connected and second side walls 16*b* and 17*b* (also referred to as front walls) opposed to the side walls 16*a* and 17*a* with the cleaner element F interposed therebetween in the opposing direction D. Further, the side walls 16 and 17 are constituted by a lower side wall 16 as a side wall of the dust chamber 12 and an upper side wall 17 as a side wall of the clean chamber 13.

Accordingly, a chamber wall of the dust chamber 12 includes the bottom wall 14 and the four lower side walls 16*a* to 16*d* and a chamber wall of the clean chamber 13 includes the top wall 15 and the four upper side walls 17*a* to 17*d*. The cleaner element F is disposed in the air cleaner case C such that rectangular peripheral edge portions Fa, Fb, Fc and Fd of the cleaner element F have substantially the same position as the pair of upper side walls 17*a* and 17*b* in the back-and-forth direction and the pair of upper side walls 17*c* and 17*d* in the left-and-right direction.

The first and second cases C1 and C2 are connected to each other in a manner such that the first and second members B1 and B2 are welded to each other at connecting portions B1*a* and B2*a* which are edge portions thereof as connecting means. For convenience in maintenance of the air cleaner 10 including the replacement of the cleaner element F, the second and third cases C2 and C3 are connected to each other by a clamp (not shown) as connecting means for removably connecting the cases.

The introduction duct 20 is connected to the lower side wall 16*a* connected so as to communicate the air introduction passage 21 with the dust chamber 12. The air introduction passage 21 has the air introduction port 21*i* and an outlet 21*o* which is opened to the dust chamber 12 by the lower side wall 16*a*. The introduction duct 20 disposed parallel to the air cleaner 10 in the back-and-forth direction is a curved duct (see FIGS. 1 and 7) which extends backward from the lower side wall 16*a* or the outlet 21*o* and is curved leftward from the direct upstream of the outlet 21*o* and the lower side wall 16*a* in order to miniaturize the air cleaning device A in the back-and-forth direction. Accordingly, the air introduction passage 21 is also a similar curved passage.

The introduction duct 20 is formed by a first duct portion 20*a* which is formed integrally with the first case C1 to be connected thereto and a second duct portion 20*b* which is formed integrally with the second case C2 to be connected thereto. The first case C1 and the first duct portion 20*a* are constituted by the first member B1 and the second case C2 and the second duct portion 20*b* are constituted by the second member B2. The first and second duct portions 20*a* and 20*b* are connected to each other in a manner such that the connecting portions B1*a* and B2*a* are welded to each other. The introduction duct 20 has a linear portion 20*s* and a single curved portion 20*c* curved in an arc in plan view.

The air introduction passage 21 has a linear passage 21*s* formed by the linear portion 20*s* and having a substantially linear passage center line on the upstream side and a single curved passage 21*c* formed by the curved portion 20*c* and connected to the downstream of the linear portions 20*s*. When the air introduction passage 21 is divided into two, that is, an upstream passage and a downstream passage, the linear passage 21*s* extending downward and inclined toward the downstream side from the introduction port 21*i* is the upstream passage having the introduction port 21*i* and the curved passage 21*c* substantially horizontally extending toward the downstream side from a curve start portion is the downstream passage having the outlet 21*o*.

As shown in FIGS. 1 and 7, in plan view, the curved passage 21*c* is curved in a direction crossing the back-and-forth direction toward the upstream side, that is, herein, to the left which is a direction perpendicular to the opposing direction D. The linear passage 21*s* extends leftward substantially parallel to the left-and-right direction toward the upstream side from the curved passage 21*c*.

Referring to FIGS. 2 and 4 to 7, by more than one partition wall which is integrally formed with a first duct portion 20*a* as one of both the duct portions 20*a* and 20*b* and is curved along the passage center line of the curved portion 20*c*, in this embodiment, by a rectification plate 22 as one partition wall, the curved passage 21*c* is divided into a predetermined number of branch passages, that is, a curved inside branch passage 23 and a curved outside branch passage 24 as two branch passages in this embodiment in the left-and-right direction. The rectification plate 22 provided in the air introduction passage 21 is disposed downstream of the introduction port 21*i* and is disposed in the curved passage 21*c* from a downstream end portion of the linear passage 21*s* to the outlet 21*o*. It is preferable that a gap between the rectification plate 22 and the duct portion 20*b* in the vertical direction is 0 or as small as possible from the viewpoint of the uniformity of the flows of the air in both the branch passages 23 and 24.

Herein, "curved inside" and "curved outside" mean positioning a curved member or a curved portion near a center of curvature of the curve and positioning the curved member or the curved portion far away from the center of the curvature of the curve with respect to a reference section.

Accordingly, the outlet 21*o* is divided into an outlet 23*o* of the curved inside branch passage 23 and an outlet 24*o* of the curved outside branch passage 24 and these outlets 23*o* and 24*o* have the same position in the vertical direction and are parallel to each other in a direction crossing the back-and-forth direction on the same horizontal plane, that is, herein, in the left-and-right direction in plan view. As a result, the outlet 21*o* is divided into the predetermined number of outlets, that is, herein, the two outlets 23*o* and 24*o* by the rectification plate 22.

A lower portion of an outlet portion 20*o* of the introduction duct 20, which forms the outlet 21*o*, is continued to the bottom wall 14 on the substantially horizontal plane (see FIGS. 5 and 6). Therefore, the air from the curved inside branch passage 23 and the curved outside branch passage 24 flows into the dust chamber 12 from the outlets 23*o* and 24*o* and then is promptly guided to the bottom wall 14 to flow in the dust chamber 12.

The rectification plate 22 disposed on the passage center line of the curved passage 21*c* in plan view suppresses the air flowing in the linear passage 21*s* so as not to largely flow to the curved outside branch passage 24 by centrifugal force. In this manner, flow rates of the air flowing in the curved inside branch passage 23 and the curved outside branch passage 24 are uniformized.

Since the air introduction passage 21 has the curved passage 21*c*, a first path length from the introduction port 21*i* to the outlet 23*o* via the curved inside branch passage 23 is set to be shorter than a second path length from the introduction port 21*i* to the outlet 24*o* via the curved outside branch passage 24. As a result, when pulsating air flows in the air introduction passage 21, the air flowing in the curved inside branch passage 23 impinges on the outlet 21*o* from the introduction port 21*i* for a short period of time as compared with the air flowing in the curved outside branch passage 24 and thus the air flowing in the curved inside branch passage 23 flows to the dust chamber 12 more rapidly than the air flowing in the curved outside branch passage 24.

Referring to FIGS. 5 to 7, in the dust chamber 12 to which the air introduction passage 21 is opened, the bottom wall 14 is provided with a lower flat portion 30 continuing to the outlet portion 20*o*, an air guiding portion 31 protruding upward with respect to the lower flat portion 30 to guide the air flowing to the dust chamber 12 from the air introduction passage 21 so as to uniformly impinge on the cleaner element F and a water collecting space 38 in which water mixed in the air and separated from the air by the cleaner element F is collected.

The air guiding portion 31 has a deflecting portion 32 and an upper flat portion 36. The deflecting portion 32 deflects upward the flows of the air which flows to the dust chamber 12 from the curved inside branch passage 23 and the curved outside branch passage 24 and then is guided to the lower flat portion 30 to be directed toward the cleaner element F disposed above the bottom wall 14. The upper flat portion 36 acts as a diffusion suppressing portion for suppressing that the flow of the air just after being deflected by the deflecting portion 32 is directed downward and is separated and diffused from the cleaner element F. Both the flat portions 30 and 36 are substantially parallel to the horizontal plane. In FIG. 5, the deflected flow of the air is schematically shown by outline arrows.

The deflecting portion 32 formed integrally with the first case C1 constituting the bottom wall 14 is formed by a raised portion in which an outer surface of the bottom wall 14 is a concave portion. Since the raised portion is raised upward from the lower flat portion 30, the raised portion protrudes upward with respect to the lower flat portion 30. The deflecting portion 32 folded in a step shape between the pair of lower side walls 16*c* and 16*d* and extending in the left-and-right direction in plan view has the predetermined number of deflecting portions. In this embodiment, the deflecting portion 32 has two deflecting portions, that is, a first deflecting portion 33 for deflecting toward the cleaner element F the flow of the air flowing from the outlet 23*o* mostly via the curved inside branch passage 23 and a second deflecting portion 34 for deflecting toward the cleaner element F the flow of the air flowing from the outlet 24*o* mostly via the curved outside branch passage 24. Further, the deflecting portion 32 has a connecting portion 35 connecting the first and second deflecting portions 33 and 34 and constituting a step portion of the first and second deflecting portions 33 and 34 in the back-and-forth direction.

The air flowing into the dust chamber 12 from the air introduction passage 21, including the air deflected by the first and second deflecting portions 33 and 34, passes through an opening portion C2*b* (see FIG. 4) provided in the second case C2 and then is directed toward the cleaner element F.

The first and second deflecting portions 33 and 34 and connecting portion 35 have substantially the same position in the vertical direction and have substantially the same position as a position having a substantially ½ width of a passage width in the vertical direction of the branch passage 23 or 24 or the air introduction passage 21, that is, as center portions of the branch passages 23 and 24. Accordingly, the first and second deflecting portions 33 and 34 and connecting portion 35 have the same position as substantially the lower halves of the branch passages 23 and 24 in the vertical direction. Intervals between each of the first and second deflecting portions 33 and 34 and connecting portion 35 and the cleaner element F are substantially equal.

As toward upward from the lower flat portion 30 to the cleaner element F, the first and second deflecting portions 33 and 34 have first and second guiding surfaces 33*a* and 34*a* curved in a convex manner toward the lower side wall 16*b* from the lower side wall 16*a* in the back-and-forth direction (or in flow direction of air toward deflecting portions 33 and 34).

The first guiding surface 33*a* acting as a guiding surface of the deflecting portion 32 and the outlet 23*o*; and the second guiding surface 34*a* acting as a guiding surface of the deflecting portion 32 and the outlet 24*o*, are disposed so as to be opposed to each other in the back-and-forth direction, respectively. Distances from a reference outlet being set by setting one of the outlets 23*o* and 24*o* as the reference outlet to the first and second guiding surfaces 33*a* and 34*a* in the back-and-forth direction are different from each other. Further, the distance from the reference outlet to the first guiding surface 33*a* is longer than the distance from the reference outlet to the second guiding surface 34*a*. In addition, the first guiding surface 33*a* is positioned substantially at the center between the dust chamber 12 and the cleaner element F in the back-and-forth direction and has the same position as an inlet 51*i* to be described later in the back-and-forth direction. The second guiding surface 34*a* is positioned substantially at the center between the outlet 24*o* and the first guiding surface 33*a* in the back-and-forth direction. Consequently, the second deflecting portion 34 is disposed closer to the outlet 21*o* or the reference outlet than the first deflecting portion 33 in the back-and-forth direction.

An interval between the first deflecting portion 33 and the second deflecting portion 34 in the back-and-forth direction is substantially the same as a difference in lengths of the first and second passages (in this embodiment, the interval may be equal to a difference in lengths of the curved inside branch passage 23 and the curved outside branch passage 24). For this reason, by the first and second deflecting portions 33 and 34, most of the air of the curved inside branch passage 23 and the curved outside branch passage 24 impinges on the cleaner element F substantially at the same time and thus a time lag between the timings at which the air passes through the cleaner element F, respectively, is reduced. Accordingly, the deflection of the flows of the air in the clean chamber 13 and the air discharge passage 41, resulting from the time lag between the timings at which the flows of the air divided in the dust chamber 12 because of the division of the air introduction passage 21 into the curved inside branch passage 23 and the curved outside branch passage 24 impinge on the cleaner element F, respectively, is suppressed.

When the air flowing into the dust chamber 12 from the curved inside branch passage 23 has a speed component toward the curved outside, the connecting portion 35 having substantially the same position as a downstream end 22*a* of the rectification plate 22 in the left-and-right direction suppresses the flow of the air so as not to be deflected to the curved outside and guides the flow of the air so as to be deflected by the first guiding surface 33*a*. Thus, the uniform impingement of the air in the dust chamber 12 on the cleaner element F can be promoted.

The flat plate-shaped upper flat portion 36 formed integrally with the second case C2 is connected to top portions of the deflecting portions 33 and 34 by welding the connecting portions B1*a* and B2*a* to each other. The upper flat portion 36 has substantially the same position as the center portions of the branch passage 23 and 24 in the vertical direction and extends forward toward the lower side wall 16*b* from the deflecting portion 32 in the back-and-forth direction. Further, the upper flat portion 36 is provided with a reinforcing rib 37 protruding upward and extending substantially horizontally in the left-and-right direction at the same position as the second deflecting portion 34 in the left-and-right direction. By the reinforcing rib 37 positioned more distant from the outlet 21*o* than the inlet 51*i* in the back-and-forth direction, the air flowing just above the second deflecting portion 34 toward the front is deflected so as to rapidly impinge on the cleaner element F in an outlet opposite-side area Rb to be described later.

The water collecting space 38 has an opening portion C2*c* (see FIG. 4) provided in the second case C2 and positioned between the lower side wall 16*b* and the upper flat portion 36 and water in the dust chamber 12 flows to the water collecting space 38 via the opening portion C2*c*. The water collecting space 38 is formed by the air guiding portion 31 and a portion 14*a* of the bottom wall 14 formed integrally with the first case C1 and continued to the deflecting portion 32. For this reasons, on the bottom wall 14, the lower flat portion 30 and the water collecting space 38 are formed by the deflecting portion 32 interposed therebetween in the back-and-forth direction and the upper flat portion 36 acts as a top wall of the water collecting space 38. In addition, the portion 14*a* and the lower flat portion 30 are provided with a drain portion 39 having a drain hole. In this manner, since the water collecting space 38 is formed by using the upper flat portion 36 of the air guiding portion 31, the water collecting space 38 can be formed without complication of structure of the bottom wall 14.

Referring to FIGS. 1 to 6 and 8, the discharge duct 40 connects the air cleaner 10 to the throttle valve device 2. The throttle valve device 2 is disposed downstream of the air cleaning device A and acts as a downstream intake component to which the air passing through the air cleaning device A flows. The throttle valve device 2 has a throttle body 2*a* as a body for forming an air passage 3 in which the air flowing from the air cleaning device A flows and a throttle valve 2*b* disposed in the air passage 3 for controlling a flow rate of the air. The air discharge passage 41 introduces the air in the clean chamber 3 into the air passage 3. The air flowing via the throttle valve device 2 flows in an air passage 5 having an intake manifold and formed by the intake pipe device 4 and then flows to the combustion chamber via the intake port.

Therefore, the intake passage is formed by the air passage P, the air passage 3 and the air passage 5.

The discharge duct 40 is connected to the upper side wall 17 connected so as to communicate the air discharge passage 41 with the clean chamber 13. The discharge duct 40 has an upstream duct 50 which is connected to the upper side wall 17*a* on the same side as the lower side wall 16*a* in the opposing direction D (or back-and-forth direction) in the chamber wall of the air cleaner chamber 11 and a downstream duct 42 which is connected to the upstream duct 50 by an upstream connecting portion 62 and connected to the throttle valve device 2 by a downstream connecting portion 75.

The air discharge passage 41 has an upstream passage 51 formed by the upstream duct 50 and having the inlet 51*i* and a downstream passage 43 formed by the downstream duct 42 and having an outlet 71*o*. The outlet 71*o* formed by the downstream connecting portion 75 is opened to the air passage 3 of the throttle valve device 2 (see FIG. 1). The upstream passage 51 is connected to the upper side wall 17*a* so as to communicate with the clean chamber 13 and has a passage center line L2 parallel to the back-and-forth direction. For this reason, in this embodiment, a direction of the passage center line L2 is the back-and-forth direction.

The upstream duct 50 is a Venturi duct which has an upstream portion 50*c* having an inlet portion 50*i* enlarged in a funnel shape and forming the inlet 51*i* opened to the clean chamber 13 and a downstream connecting portion 50*d* forming an outflow port 51*o* opened to a downstream passage 61. The outflow port 51*o* allows the air flowing from the inlet 51*i* to flow to the curved passage 61 to be described later as an air passage on the outside of the clean chamber 13. The downstream connecting portion 50*d* connected to the downstream duct 42 has a flange portion 50*e* formed integrally with the upper side wall 17*a* and extends backward to the outside of the clean chamber 13 from the upper side wall 17*a* in the back-and-forth direction.

The third case C3 and the upstream duct 50 are constituted by the third member B3 and the upstream duct 50 is formed integrally with the third case C3.

Referring to the drawings in addition to FIG. 7, the upstream portion 50*c* extends forward toward the upper side wall 17*b* from the upper side wall 17*a* in the clean chamber 13. The upstream passage 51 has the inlet 51*i* at a position disposed away from the upper side wall 17*a* in the back-and-forth direction in the clean chamber 13. The inlet 51*i* is substantially positioned on a plane H perpendicular to the back-and-forth direction and crossing the first deflecting portion 33 and is opened to the clean chamber 13. For this reason, the upstream duct 50 is connected to the side wall 17*a* of the clean chamber 13 among the first side walls 16*a* and 17*a* and extends in the back-and-forth direction in the clean chamber 13.

Using the plane H as a boundary including the passage center line L2 of the upstream passage 51 at the inlet 51*i*, the air cleaner chamber 11 and the cleaner element F are divided into two, that is, an outlet-side area Ra close to the outlet 21*o* of the air introduction passage 21 and the outlet opposite-side area Rb remote from the outlet 21*o*.

In the back-and-forth direction, the guiding surface 34*a* of the second deflecting portion 34 is positioned substantially at a center between the upper side wall 17*a* or the outflow port 51*o* and the inlet 51*i*, or positioned slightly nearer to the outlet 21*o* than the center. Therefore, the guiding surface 34*a* is positioned substantially at a center in the back-and-forth direction of a passage portion 51*c* formed by the upstream portion 50*c* of the upstream duct 50 or the upstream portion 50*c* in the upstream passage 51, or positioned slightly nearer to the outlet 21*o* than the center.

In plan view, at least a part of the first deflecting portion 33 and at least a part of the second deflecting portion 34 are positioned between the inlet 51*i* and the outflow port 51*o* in the back-and-forth direction. Herein, the whole guiding surface 33*a* which has a downstream end at substantially the same position as the inlet 51*i* in the back-and-forth direction and the whole of the guiding surface 34*a* are positioned between the inlet 51*i* and the outflow port 51*o* in the back-and-forth direction. In plan view, the first deflecting portion 33 is disposed near the inlet 51*i* in the back-and-forth direction and in plan view, the second deflecting portion 34 are disposed near the outflow port 51*o* in the back-and-forth direction.

The upstream portion 50*c* is formed by a lower duct portion 50*a* protruding downward in the clean chamber 3 and acting as a partition wall for the clean chamber 13 and the upstream passage 51 and an upper duct portion 50*b* acting as a part of the top wall 15 and protruding upward from first top walls 15*c* and 15*d* to be described later.

As for the first top walls 15*c* and 15*d* which are a part of the top wall 15 in the outlet-side area Ra in which the upstream portion 50*c* is positioned, an interval between the first top walls and the cleaner element F in the vertical direction is smaller than a second top wall 15*b* which is a part of the top wall 15 in the outlet opposite-side area Rb. A pair of the first top walls 15*c* and 15*d* positioned with the upstream portion 50*c* interposed therebetween have substantially the same position as the passage center line L2 of the upstream passage 51 in the vertical direction. As compared with the case where the first top walls 15*c* and 15*d* have the same position as the second top wall 15*b* in the vertical direction, the first top walls 15*c* and 15*d* can rapidly deflect the air passing through the cleaner element F including the air deflected by the second deflecting portion 34 toward the inlet 51*i* and thus an effect of suppressing the generation of stagnation of the air between the first top walls 15*c* and 15*d* and the cleaner element F in the vertical direction can be improved.

Referring to FIGS. 3 to 5 and 8, the upper duct portion 50*b* is provided with a mounting portion 81 on which an air flow meter 80 (see FIG. 1 also) for detecting a flow rate of the air flowing in the intake passage is mounted by a screw near the downstream connecting portion 50*d*. A detecting portion 80*a* of the air flow meter 80, which is provided in the internal combustion engine E to detect an intake air amount to be used for controlling an amount of fuel and an ignition timing, is disposed in the upstream passage 51 via a through hole 81*a* provided in the mounting portion 81.

Referring to FIGS. 1 to 6 and 8, the downstream duct 42 is formed by a curved duct 60 acting as a first downstream duct as an inner passage forming component connected to the downstream connecting portion 50*d* and a second downstream duct 70 acting as an outer passage forming component surrounding at least a part of the curved duct 60. The downstream passage 43 formed by the curved duct 60 and the downstream duct 70 is an air passage disposed downstream of the air flow meter 80 as well as the passage portion 51*d* formed by the downstream connecting portion 50*d* in the upstream passage 51. The downstream passage 43 has the curved passage 61 acting as a first downstream passage formed by the curved duct 60 and a second downstream passage 71 formed by the downstream duct 70 to act as an air chamber to which an outflow port 61*o* of the curved passage 61 is opened. Herein, the passage portion 51*d* and the curved passage 61 are first air passages disposed downstream of the air flow meter 80 and the downstream passage 71 is a second air passage disposed downstream of the air flow meter 80.

The second downstream duct 70 and the second downstream passage 71 at least partially surround all of the curved duct 60 and the curved passage 61 in a direction along a passage center line L3 of the curved passage 61 (or flow direction). In this embodiment, the second downstream duct 70 and the second downstream passage 71 surround most of the curved duct 60 and the curved passage 61 from the outside. In addition, the downstream duct 70 and the downstream passage 71 surround at least partially surround the curved duct 60 and the curved passage 61 with the whole circumference thereof in a circumferential direction. In this embodiment, the downstream duct and the downstream passage surround the curved duct 60 and the curved passage 61 over the whole circumference thereof and surround all of a curved portion 63 and a curved passage portion 65 to be described later.

For this reason, the downstream duct 42 has at least a part of double-pipe structure in the circumferential direction, in which the curve duct 60 acts as an inner pipe and the downstream duct 70 acts as an outer pipe in a portion in which the downstream duct 70 surrounds the curved duct 60. In this embodiment, the downstream duct 42 has double-pipe structure over the whole circumference thereof.

The curved duct 60 including a duct B5 having rubbery elasticity has the upstream connecting portion 62 fitted to an outer circumference of the downstream connecting portion 50*d* of the upstream duct 50 and formed in an accordion shape so as to be stretched in a flow direction and the curved portion 63 connected to the downstream of the upstream connecting portion 62. In order to miniaturize the air cleaning device A in the back-and-forth direction, the curved duct 60 extends backward from the upper side wall 17*a* or the outflow port 51*o* and is curved rightward. The upstream connecting portion 62 has a convex portion 62*b* as a position determining portion engaging with a concave portion 74*b* of the downstream duct 70.

The curved passage 61 has a linear passage portion 64 formed by the upstream connecting portion 62 and the curved passage portion 65 formed by the curved portion 63. The passage portion 64 has an inflow port 61*i* of the curved passage 61 and the curved passage portion 65 has an outflow port 61*o* of the curved passage 61.

The upstream connecting portion 62 has an upstream-side seal portion 67 surrounding the downstream connecting portion 50*d* and coming into contact with the flange portion 50*e* in a flow direction and a downstream-side seal portion 68 having seal portions 68*a* and 68*b* coming into contact with an upstream connecting portion 74 of the downstream duct 70 in a flow direction and a radial direction, respectively. Herein, regarding the curved duct 60 and the downstream duct 70, the radial direction is a radial direction of the curved duct 60 with respect to the passage center line L3.

In a state in which the air cleaning device A is assembled, the upstream connecting portion 62 is pressed and shortened in a flow direction by the flange portion 50*e* and the upstream connecting portion 74 and air-tightly seals a space between the upstream duct 50 and the downstream duct 70. For this reason, the curved duct 60 having the upstream connecting portion 62 also acts as a seal member for sealing the space between the upstream duct 50 and the downstream duct 70.

In plan view, the curved portion 63 and the curved passage portion 65 are curved and extend in a direction crossing the back-and-forth direction toward the back from the passage portion 64 and the upstream connecting portion 62 having the passage center line L3 coincident with the passage center line L2 of the upstream passage 51. In this embodiment, the curved portion 63 and the curved passage portion 65 are curved and extend rightward in the left-and-right direction. The outflow port 61*o* formed by a downstream end portion 63*d* of the curved portion 63 is opened substantially rightward. For this reason, a flow direction of the air at the inflow port 61*i* and a flow direction of the air at the outlet 71*o* are different from each other and are crossed in plan view. The air at the outflow port 61*o* flows toward the outlet 71*o*.

The downstream duct 70 is formed by a concave-shaped case 72 forming a space for accommodating the curved duct 60 and opened downward and a plate-shaped cover B6. The case 72 and the cover B6 are connected to each other in a manner such that a connecting portion B4*b* (see FIG. 5) as an edge portion of an opened bottom portion of the case 72 and a connecting portion B6*a* (see FIGS. 1 and 5) as an edge portion of the cover B6 are welded to each other as connecting means. The cover B6 also acts as a partition wall for dividing the downstream passage 71 and the resonance chamber 93.

The downstream duct 70 has a surrounding portion 73 having the upstream connecting portion 74 and surrounding the curved duct 60 over the circumference thereof and the downstream connecting portion 75 disposed downstream of the surrounding portion 73 and connected to the throttle valve device 2. The upstream connecting portion 74 has the concave portion 74*b* as a positioning portion for setting a relative position with respect to the connected curved duct 60. The upstream connecting portion 74 comes into contact with an outer circumference of the downstream seal portion 68 and is fitted thereto.

The downstream passage 71 has a surrounding passage 76 and a linear passage 77 having the outlet 71*o* and positioned downstream of the surrounding passage 76. The surrounding passage 76 is formed by the surrounding portion 73 and acts as an annular passage surrounding the curved duct 60 over the circumference thereof from the downstream-side seal portion 68 which is a downstream end portion of the upstream connecting portion 62 to the downstream end portion 63*d*.

The surrounding passage 76 formed between the curved duct 60 and the surrounding portion 73 in the radial direction of the curved duct 60 is closed at the upstream end portion 76*a* of the surrounding passage 76 by connecting the upstream connecting portion 74 and upstream connecting portion 62 each other in air-tight manner. Further, the surrounding passage 76 is a space formed upstream of the outflow port 61*o* in the downstream passage 71.

Figure 8:
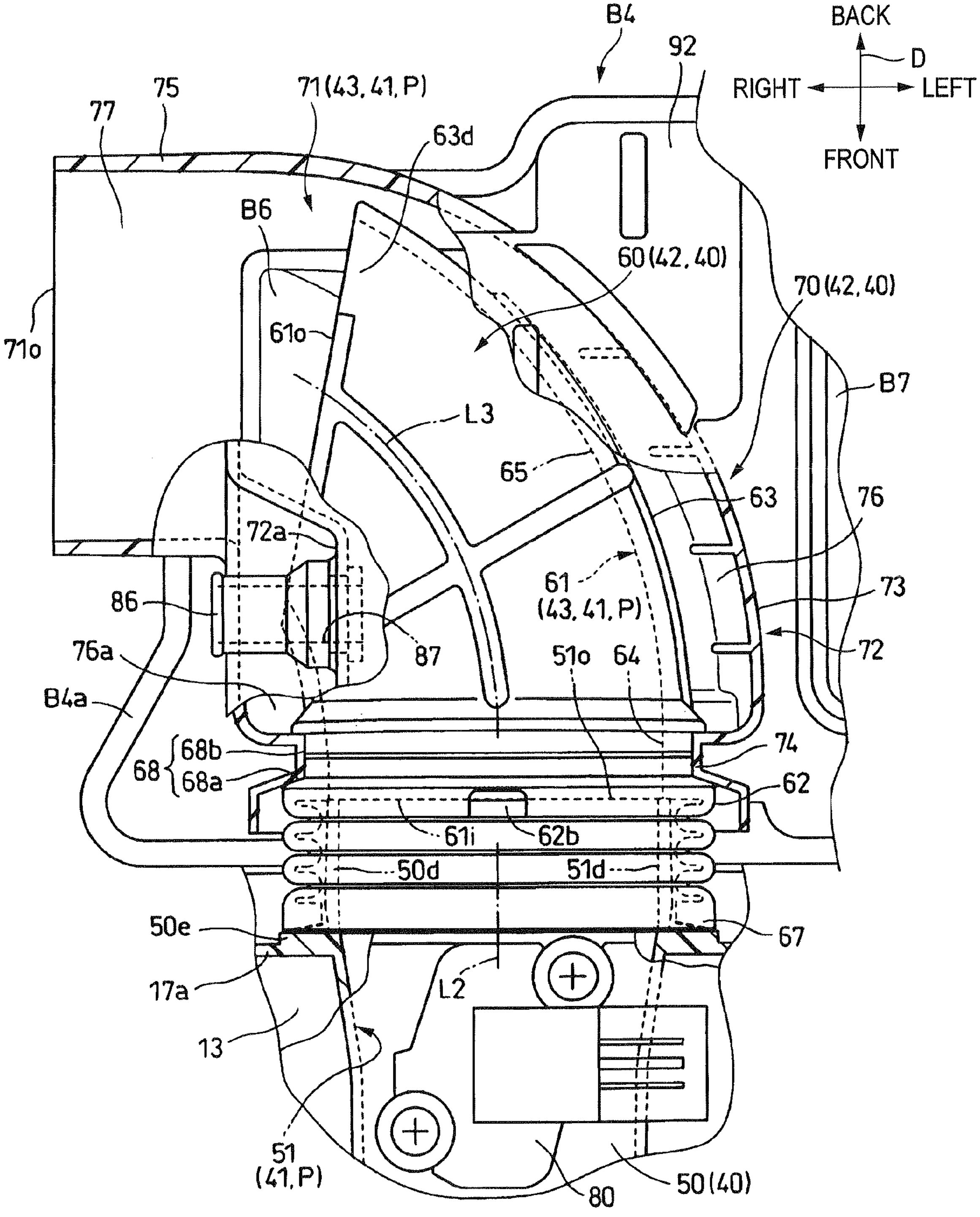
FIG. 8 is a plan view showing a cross-section of a part of the main part of the air cleaning device of FIG. 1.

As shown in FIG. 8, in plan view, toward back from the upstream connecting portion 62 or the inflow port, the curved duct 60 and the curved passage 61 are curved in a direction crossing the back-and-forth direction as reaching upstream side. Herein, the curved duct 60 and the curved passage 61 are curved to the right which is a direction perpendicular to the back-and-forth direction. The passage 77 linearly extends to the right toward the downstream side from the outflow port 61*i* of the curved passage 61 to be substantially parallel to the left-and-right direction.

In assembling of the air cleaning device A, by welding the second member B2 to the fourth member B4 at the connecting portions B2*b*, B4*a* which are edge portions thereof (refer to FIG. 5), the lower duct 70 is connected to the first and second cases C1, C2 which are integrated at the air cleaner 10. After that, the curved duct 60 is inserted into the downstream duct 70 via the upstream connecting portion 74. After that, in a state in which the upstream connecting portions 62 and 74 are connected to each other, the downstream connecting portion 50*d* is inserted into the upstream connecting portion 62. In a state in which the upstream duct 50 and the curved duct 60 presses the upstream connecting portion 62 in a flow direction, the third case C3 is connected to the second case C2 by a clamp.

Referring to FIGS. 1 to 3, 5 and 8, the internal combustion engine E has a blow-by gas returning device to return a blow-by gas to the intake passage. The returning device has a gas-liquid separator for separating oil mixed in the blow-by gas introduced from a crank chamber formed by the engine body 1 and a return line forming a return passage through which the blow-by gas from which the oil is separated is introduced into the intake passage. The return line has a conduit 85 (see FIG. 6) for introducing the blow-by gas from the gas-liquid separator and a grommet 86 connected to the conduit 85, provided in the discharge duct 40 and acting as an introduction portion for allowing the blow-by gas to flow to the downstream passage 71 of the air discharge passage 41 at a position disposed downstream of the air flow meter 80. A blow-by gas introduction port 87 of the return passage, which is opened to the downstream passage 71 is formed by the grommet 86.

The grommet 86 is mounted in a state in which a through hole as an opening portion provided in a mounting portion 72*a* is formed in the mounting portion 72*a* which is a concave portion provided in the case 72. In an upper portion of the surrounding passage 76 (in this embodiment, in the vicinity of an uppermost portion), as viewed in a direction (coincident with the vertical direction in this embodiment) perpendicular to a plane substantially including the passage center line L3 of the curved duct 60 or curved passage portion 65, the blow-by gas introduction port 87 is disposed on the curved inside of the curved duct 60 or the curved passage portion 65 (in this embodiment, on the curved inside with respect to the passage center line L3).

For this reason, the blow-by gas introduction port 87 is opened to the surrounding passage 76 or a space between the curved duct 60 and the surrounding portion 73 in the radial direction. In addition, in plan view, the blow-by gas introduction port 87 is disposed in a curved inside space as a fan-shaped space smaller than a curved outside space as a fan-shaped space formed the curved outside with the passage center line L3 as a boundary.

In order to reduce an effect of flow rate fluctuation of the blow-by gas flowing from the blow-by gas introduction port 87 on the detection accuracy of the air flow meter 80, it is preferable to make a distance from the blow-by gas introduction port 87 to the outflow port 61*o* longer and to position the blow-by gas introduction port 87 at the upstream end portion 76*a* including a portion most remote from the outflow port 61*o*. Further, a direction of the through hole constituting the blow-by gas introduction port 87 is set such that a flow direction of the blow-by gas from the blow-by gas introduction port 87 is set as a direction substantially opposite to a flow direction of the air at the outflow port 61*o* (in this embodiment, set to the left).

Referring to FIGS. 1 to 4, 6 and 7, the resonator 90 provided to partially surround the introduction duct 20 is formed by the cover B7 and cases 91 and 92 having the second and fourth members B2 and B4. The cover B7 has a pair of claws B7*a* inserted into a pair of mounting portions 92*a* provided in the case 92 and is connected to the case 92 by a screw.

A chamber wall of the resonance chamber 93 is formed at the cases 91 and 92 and the second duct portion 20*b* and the communicating passage 94 for communicating the resonance chamber 93 with the curved outside branch passage 24 is formed by a passage forming portion 95*a* formed integrally with the first duct portion 20*a* and a tubular passage forming portion 95*b* formed integrally with the second duct portion 20*b*.

Next, effects and advantages of the embodiment constructed as described above will be described. The flow of the air flowing to the dust chamber 12 from the outside of the internal combustion engine E via the air introduction passage 21 by the operation of the internal combustion engine E is guided by the air guiding portion 31 and is deflected upward. Then, the air passes through the cleaner element F and flows to the clean chamber 13. The air in the clean chamber 13 flows to the air passage 3 of the throttle valve device 2 via the air discharge passage 41. After a flow rate of the air is controlled by the throttle valve 2*b*, the air is sucked into the combustion chamber via the air passage 5 of the intake pipe device 4.

The pair of side walls 16*a* and 16*b* of the dust chamber 12 of the air cleaner chamber 11 is formed by the side wall 16*a* to which the air introduction passage 21 is connected and the side wall 16*b* which is opposed to the side wall 16*a* with the cleaner element F interposed therebetween in the back-and-forth direction as the opposing direction D. The air introduction passage 21 has the curved passage 21*c* divided into the curved inside branch passage 23 and the curved outside branch passage 24 by the rectification plate 22. By the curved passage 21*c*, the first path length from the introduction port 21*i* to the outlet 21*o* via the curved inside branch passage 23 is set to be shorter than the second path length from the introduction port 21*i* to the outlet 21*o* via the curved outside branch passage 24. In plan view, the curved passage 21*c* is curved in the left-and-right direction which crosses the back-and-forth direction toward the upstream side and in the dust chamber 12, the first deflecting portion 33 and the second deflecting portion 34 are provided to deflect the flows of the air flowing to the dust chamber 12 from the outlet 21*o* via the curved inside branch passage 23 and the curved outside branch passage 24 to be directed to the cleaner element F. The second deflecting portion 34 is positioned closer to the outlet 21*o* than the first deflecting portion 33 in the back-and-forth direction. According to those constructions, the following effects are obtained.

Since the air introduction passage 21 connected to the side wall 16*a* among the pair of side walls 16*a* and 16*b* which are opposed to each other with the cleaner element F interposed therebetween in the back-and-forth direction is curved in a direction crossing the back-and-forth direction in plan view, the air cleaning device A can be miniaturized in the back-and-forth direction.

In addition, since the flow of the air in the curved passage 21*c* is regulated so as not to be deflected to the curved outside by the rectification plate 22 dividing the curved passage 21*c* into the curved inside branch passage 23 and the curved outside branch passage 24, the flow of the air flowing to the dust chamber 12 from the air introduction passage 21 having the curved passage 21*c* is uniformized and since the positions of the first and second deflecting portions 33 and 34 are different from each other in the back-and-forth direction, the flows of the air from the branch passages 23 and 24 are directed to the cleaner element F over a wide range in the back-and-forth direction. Therefore, the air flowing to the dust chamber 12 from the air introduction passage 21 which has the curved passage 21*c* and in which the curved inside branch passage 23 and the curved outside branch passage 24 are formed by the rectification plate 22 can uniformly impinge on the cleaner element F and the whole cleaner element F can be used. Accordingly, the life of the cleaner element F can be lengthened.

Further, since the second deflecting portion 34 is positioned closer to the outlet 21*o* than the first deflecting portion 33 in accordance with the second path length being longer than the first path length, the time lag between the timings at which the flows of the air flowing to the dust chamber 12 from the curved inside branch passage 23 and the curved outside branch passage 24 are deflected by the first and second deflecting portions 33 and 34, respectively, is reduced. Consequently, the time lag between the timings at which the flows of the air impinge on the cleaner element F, respectively, is reduced. Therefore, the deflection of the flows of the air in the clean chamber 13 and the air discharge passage 41 is suppressed and the uniformity of the flow of the air in the air discharge passage 41 is thereby improved. As a result, the detection accuracy of the intake air amount by the air flow meter 80 disposed in the upstream passage 51 of the air discharge passage 41 is improved and the uniformity of mixing of the blow-by gas flowing to the downstream passage 71 from the blow-by gas introduction port 87 with the sucked air is improved.

Further, since the interval between the first deflecting portion 33 and the second deflecting portion 34 in the back-and-forth direction is substantially the same as the difference between the first path length and the second path length, the first and second deflecting portions 33 and 34 are disposed away from each other with the interval therebetween, which is the same as the difference between the first path length and the second path length. Accordingly, the time lag between the timings at which the flows of the air flowing to the dust chamber 12 from the curved inside branch passage 23 and the curved outside branch passage 24 are deflected by the first and second deflecting portions 33 and 34, respectively, is largely reduced. Consequently, the time lag between the timings at which the flows of the air impinge on the cleaner element F, respectively, is largely reduced. Therefore, the deflection of the flow of the air in the clean chamber 13 and the air discharge passage 41 including the upstream passage 51 is more suppressed and the uniformity of the flow of the air in the air discharge passage 41 is thereby more improved.

In the clean chamber 13, the air discharge passage 41 extends toward the side wall 17*b* from the side wall 17*a* and has the inlet 51*i* at a position disposed away from the side wall 17*a* or the peripheral edge portion Fa of the cleaner element F. In addition, the second deflecting portion 34 is positioned between the side wall 17*a* or the peripheral edge portion Fa and the inlet 51*i* in the back-and-forth direction. Thus, the air deflected by the second deflecting portion 34 passes through the cleaner element F and then flows to the side wall 17*a* in the back-and-forth direction or to the outlet-side area Ra between the peripheral edge portion Fa and the inlet 51*i* in the clean chamber 13 to flow toward the inlet 51*i*. Accordingly, the generation of stagnation of the air in the outlet-side area Ra of the clean chamber 13 is suppressed and thus the flow of the air in the clean chamber 13 becomes smooth. As a result, the air in the dust chamber 12 can uniformly impinge on the cleaner element F even when the inlet 51*i* of the air discharge passage 41 is disposed away from the first side wall 17*a* or the peripheral edge portion Fa.

Since the deflecting portions 33 and 34 are formed by the raised portion provided on the bottom wall 14 and raised upward and have the curved guiding surfaces 33*a* and 34*a*, the flows of the air flowing to the dust chamber 12 from the branch passages 23 and 24 and then flowing in the vicinity of the bottom wall 14 along the bottom wall 14 are deflected toward the cleaner element F disposed on the upper side by the deflecting portions 33 and 34 formed by the raised portion raised forward from the bottom wall 14. Accordingly, the flow of the air between the bottom wall 14 and the cleaner element F is efficiently directed to the cleaner element F by the flows of the air deflected by the deflecting portions 33 and 34 from the vicinity of the bottom wall 14. As a result, since the deflecting portions 33 and 34 for allowing the air flowing from the air introduction passage 21 to uniformly impinge on the cleaner element F can be miniaturized and the flows of the air are smoothly deflected because of the curved guiding surfaces 33*a* and 34*a* of the deflecting portions 33 and 34, air flow resistance in the dust chamber 12 is reduced and an air-intake efficiency is improved.

The air discharge passage 41 has the upstream passage 51 having the inlet 51*i* and the outflow port 51*o* for allowing the air flowing from the inlet 51*i* to flow to the curved passage 61 disposed outside of the clean chamber 13. The upstream passage 51 is formed by the upstream duct 50 connected to the side wall 17*a* of the clean chamber 13 among the first side walls 16*a* and 17*a* and extending in the back-and-forth direction in the clean chamber 13. In addition, as viewed in the vertical direction, the first deflecting portion 33 and the second deflecting portion 34 are positioned between the inlet 51*i* and the outflow port 51*o* in the back-and-forth direction. Thus, the air deflected by the second deflecting portion 34 passes through the cleaner element F and then flows to the outlet-side area Ra between the inlet 51*i* and the outflow port 51*o* of the upstream passage 51 in the clean chamber 13 to flow toward the inlet 51*i*. Accordingly, the generation of stagnation of the air in the outlet-side area Ra is suppressed and thus the flow of the air in the clean chamber 13 becomes smooth. As a result, the air in the dust chamber 12 can uniformly impinge on the cleaner element F by the second deflecting portion 34 even when the inlet 51*i* and the outflow port 51*o* of the upstream passage 51 formed by the upstream duct 50 disposed in the clean chamber 13 are disposed away from each other in the back-and-forth direction.

As for the first and second deflecting portions 33 and 34 disposed between the inlet 51*i* and the outflow port 51*o* in the back-and-forth direction, the first deflecting portion 33 is disposed near the inlet 51*i* in the back-and-forth direction and the second deflecting portion 34 is disposed near the outflow port 51*o* in the back-and-forth direction. Accordingly, by the first deflecting portion 33, the air flowing from the air introduction passage 21 in the dust chamber 12 is deflected upward so as to be directed to the area (that is, outlet opposite-side area Rb) between the inlet 51*i* and the side wall 17*b* in the back-and-forth direction and by the second deflecting portion 34, the air is deflected upward so as to be directed to the area (that is, outlet-side area Ra) between the inlet 51*i* and the outflow port 51*o* in the back-and-forth direction. As a result, the air in the dust chamber 12 can uniformly impinge on the cleaner element F. In addition, since interference between the flows of the air deflected by the first and second deflecting portions 33 and 34 can be reduced, an effect of allowing the air to uniformly impinge on the cleaner element F can be more improved.

The air passage P formed by the air cleaning device A has the curved passage 61 which acts as the first downstream passage disposed downstream of the air flow meter 80 and the second downstream passage 71 which has the surrounding passage 76 surrounding the curved duct 60 as the downstream duct forming the curved passage 61 and to which the outflow port 61*o* of the curved passage 61 is opened. In addition, by the blow-by gas introduction port 87 opened to the surrounding passage 76 in the upstream of the outflow port 61*o*, the surrounding passage 76 to which the blow-by gas introduction port 87 is opened is a passage surrounding the curved duct 60. Accordingly, the surrounding passage 76 is a passage in which the flow of the air is less than that of the curved passage 61 and the flow rate fluctuation of the blow-by gas is reduced in the surrounding passage 76. In addition, since the flow rate fluctuation of the blow-by gas is transmitted to the air in the curved passage 61 from the outflow port 61*o* via the surrounding passage 76, a transmission path length which is a length of a path when the flow rate fluctuation is transmitted to the air flow meter 80 from the blow-by gas introduction port 87 is longer than a length of the curved passage 61 by a length of the surrounding passage 76. As a result, an effect of the flow rate fluctuation of the blow-by gas flowing to the downstream passage 71 of the air passage P on the detection of the flow rate of the air by the air flow meter 80 is reduced and the detection accuracy of the air flow meter 80 is improved. By the surrounding passage 76, the transmission path length is made longer without making the length of the curved passage 61 longer, an effect of the flow rate fluctuation of the blow-by gas on the air flow meter 80 can be reduced and the air cleaning device A can be miniaturized.

Since the surrounding passage 76 is an annular passage surrounding the curved duct 60 over the whole circumference thereof, the volume of the surrounding passage 76 is large. Thus, the flow rate fluctuation of the blow-by gas in the surrounding passage 76 is more reduced. Accordingly, an effect of the flow rate fluctuation of the blow-by gas on the detection of the flow rate of the air flow meter 80 can be more reduced. Further, since the blow-by gas can be allowed to flow to the downstream of the outflow port 61*o* over a wide range in a circumferential direction, the uniformity of mixing of the blow-by gas with the sucked air flowing from the curved duct 60 can be improved.

The flow direction of the air at the inflow port 61*i* of the curved passage 61 and the flow direction of the air at the outlet 71*o* of the downstream passage 71 are different from each other and the curved duct 60 is curved so as to direct the flow of the air of the outflow port 61*o* of the curved passage 61 to the outlet 71*o*. Accordingly, even when the flow direction of the air at the inflow port 61*i* and the flow direction of the air at the outlet 71*o* are different from each other, the air flowing in the curved passage 61 is smoothly introduced toward the outlet 71*o* by the curved duct 60 to flow from the outflow port 61*o* toward the outlet 71*o* and thus the air flowing from the curved passage 61 is suppressed so as not to flow in a turbulent manner in the passage 77 of the downstream passage 71 and the air-intake efficiency is improved.

Since the blow-by gas introduction port 87 is disposed on the upper side and on the curved inside with respect to the passage center line L3 of the curved duct 60 in the surrounding passage 76, the blow-by gas introduction port 87 is opened to the surrounding passage 76 on the upper side and on the more curved inside than the passage center line L3. Thus, the remaining oil remaining in the blow-by gas flows toward the outflow port 61*o* together with the blow-by gas while dropping in the surrounding passage 76 and is mixed with the air flowing from the curved passage 61. As a result, by effectively using a space formed when the curved duct 60 is used, the accumulation of the remaining oil in a lower portion of the surrounding passage 76 is suppressed and the remaining oil is easily introduced into the passage 77 disposed downstream of the outflow port 61*o*.

Further, although the curved inside space is a space narrower than the curved outside space, since the blow-by gas introduction port 87 not requiring a large space for the arrangement is disposed in the curved inside space, a part of the air cleaning device A (for example, cover B7 of resonator 90) or a different member such as a peripheral component around the air cleaning device A can be disposed in the curved outside space. In this manner, the use of the curved outside space can be maximized. In addition, by effectively using the space formed when the curved duct 60 is used, a degree of freedom in arrangement of the further member can be increased and thus the miniaturization of the air cleaning device A or the compact arrangement of the air cleaning device A and the peripheral component can be realized.

The air cleaning device A has the upstream duct 50 on which the air flow meter 80 is mounted, the curved duct 60 and the second downstream duct 70 forming the second downstream passage 71. Since the curved duct 60 is a seal member for sealing the space between the upstream duct 50 and the second downstream duct 70, the curved duct 60 also acts as a seal member for air-tightly connecting the upstream duct 50 and the second downstream duct 70. As a result, only the upstream duct 50, the curved duct 60 and the second downstream duct 70 are required and a further seal member is not required. In this manner, the number of components can be reduced and the cost can be thereby reduced.

Hereinafter, modified structure according to an embodiment where a part of the structure of the above-described embodiment is modified will be described. The intake component also may be a component constituting the intake device other than the air cleaning device A, such as the throttle valve device 2 or the intake pipe device 4. The curved passage 21*c* may be formed such that the curved inside branch passage and the curved outside branch passage are divided by the partition wall with a two-step shaped gap interposed therebetween.

The predetermined number may be three or more. In this case, the curved passage 21*c* is divided into three or more branch passages by two or more partition walls and the invention is applied to two branch passages adjacent to each other.

At least a part of the plurality of deflecting portions of the deflecting portion may have a shape other than the raised portion and may be provided on a portion other than the bottom wall in the air cleaner, such as the side wall.

The air introduction passage may have a downstream linear passage connected to the downstream of the curved passage and the curved passage 21*c* and the downstream linear passage may be divided into the curved inside branch passage and a linear branch passage disposed downstream thereof and the curved outside branch passage and a linear branch passage disposed downstream thereof by the partition wall.

The guiding surfaces 33*a* and 34*a* may be constituted by a single inclined plane at an angle of inclination and may be constituted by a composite surface, such as a plurality of curved surfaces having different curvatures, a plurality of inclined planes having different angles of inclination or a combination of a curved surface and an inclined plane.

The second downstream duct 70 may be connected to the upstream duct 50 to surround the whole curved duct 60 and a part of the upstream duct, such as the downstream connecting portion 50*d*. In this case, the part (for example, downstream connecting portion 50*d*) is a part of the downstream duct according to Claims of the invention.

The second downstream duct 70 may surround a part of the curved duct 60 in the circumferential direction, not the whole circumference thereof and thus the surrounding passage 76 may be not an annular passage and partially surround the curved duct 60 in the circumference direction.

The blow-by gas introduction port 87 may be opened in the lower portion of the surrounding passage 76. The internal combustion engine may be mounted on machines other than vehicles.

This application is based on Japanese Patent Application (P.2007-233566), filed on Sep. 10, 2007 and Japanese Patent Application (P.2007-233567), filed on filed on Sep. 10, 2007, the contents of which are incorporated herein by reference.

The invention claimed is:

1. An air cleaning device for an internal combustion engine, comprising:

an air cleaner chamber divided into a dust chamber formed on a lower side and a clean chamber formed on an upper side while interposing a cleaner element therebetween in a vertical direction, wherein an outlet of an air introduction passage having an air introduction port is opened to the dust chamber, an inlet of an air discharge passage is opened to the clean chamber, wherein a chamber wall of the air cleaner chamber includes a bottom wall opposed to the cleaner element in the vertical direction and a pair of side walls extending from the bottom wall, the pair of side walls comprises a first side wall to which the air introduction passage is connected and a second side wall which is opposed to the first side wall in an opposing direction while interposing the cleaner element therebetween, the air introduction passage has a curved passage which is divided into a curved inside branch passage and a curved outside branch passage by a partition wall, a first path length from the air introduction port to the outlet via the curved inside branch passage is set to be shorter than a second path length from the air introduction port to the outlet via the curved outside branch passage, the curved passage is curved in a direction crossing the opposing direction toward an upstream side, as viewed in the vertical direction, first and second deflecting portions are provided in the dust chamber to deflect upward flows of air flowing to the dust chamber from the outlet via the curved inside branch passage and the curved outside branch passage, respectively, to thereby direct the flows of air to the cleaner element and the second deflecting portion is positioned closer to the outlet than the first deflecting portion in the opposing direction.

2. The air cleaning device for the internal combustion engine according to claim 1, wherein the air discharge passage extends toward the second side wall from the first side wall and has the inlet at a position distant from the first side wall in the clean chamber and the second deflecting portion is positioned between the first side wall and the inlet in the opposing direction.

3. The air cleaning device for the internal combustion engine according to claim 1 or 2, wherein the first and second deflecting portions comprises a raised portion which is provided on the bottom wall and is raised upward.

4. The air cleaning device for the internal combustion engine according to claim 1 or 2, wherein an interval between the first and second deflecting portions in the opposing direction is substantially the same as a difference between the first path length and the second path length.

5. The air cleaning device for the internal combustion engine according to claim 1, wherein the air discharge passage has an upstream passage having the inlet and an outflow port through which the air flowing from the inlet flows to the outside of the clean chamber, the upstream passage is formed by an upstream duct connected to the side wall of the clean chamber in the first side wall and extending in the opposing direction in the clean chamber and the first and second deflecting portions are positioned between the inlet and the outflow port in the opposing direction, as viewed in the vertical direction.

6. The air cleaning device for the internal combustion engine according to claim 5, wherein the first deflecting portion is disposed near the inlet in the opposing direction and wherein the second deflecting portion is disposed near the outflow port in the opposing direction.

7. An internal combustion engine comprising:

an air flow meter which detects flow rate of air flowing in an intake passage; and the air cleaning device according to claim 1, forming an air passage constituting the intake passage, wherein the air passage includes a first air passage which is disposed downstream of the air flow meter and a second air passage which has a surrounding passage at least partially surrounding in a circumferential direction a downstream duct forming the first air passage and to which an outflow port of the first air passage is opened and a blow-by gas introduction port through which a blow-by gas flows to the intake passage is opened to the surrounding passage in the upstream of the outflow port.

8. The internal combustion engine according to claim 7, wherein the surrounding passage is an annular passage surrounding the downstream duct over whole circumference thereof.

9. The internal combustion engine according to claim 7 or 8, wherein a flow direction of the air at an inflow port of the first air passage and a flow direction of the air at an outlet of the second air passage are different from each other and the downstream duct is a curved duct curved so as to direct the flow of the air at the outflow port to the outlet of the second air passage and the first air passage is a curved passage.

10. The internal combustion engine according to claim 7 or 8, wherein the blow-by gas introduction port is disposed on the upper side and on the curved inside with respect to a passage center line of the curved duct in the surrounding passage.

11. The internal combustion engine according to claim 7 or 8, wherein the air cleaning device has an upstream duct having the air flow meter mounted thereon, the downstream duct and a second downstream duct forming the second air passage and the downstream duct is a seal member for sealing a space between the upstream duct and the second downstream duct.

12. The air cleaning device for the internal combustion engine according to claim 3, wherein an interval between the first and second deflecting portions in the opposing direction is substantially the same as a difference between the first path length and the second path length.

13. The internal combustion engine according to claim 9, wherein the blow-by gas introduction port is disposed on the upper side and on the curved inside with respect to a passage center line of the curved duct in the surrounding passage.

14. The internal combustion engine according to claim 9, wherein the air cleaning device has an upstream duct having the air flow meter mounted thereon, the downstream duct and a second downstream duct forming the second air passage and the downstream duct is a seal member for sealing a space between the upstream duct and the second downstream duct.

15. The internal combustion engine according to claim 10, wherein the air cleaning device has an upstream duct having the air flow meter mounted thereon, the downstream duct and a second downstream duct forming the second air passage and the downstream duct is a seal member for sealing a space between the upstream duct and the second downstream duct.

* * * * *